US010425776B2

(12) United States Patent
Bestor et al.

(10) Patent No.: US 10,425,776 B2
(45) Date of Patent: Sep. 24, 2019

(54) METHOD AND DEVICE FOR RESPONDING TO AN AUDIO INQUIRY

(71) Applicant: MOTOROLA SOLUTIONS, INC, Chicago, IL (US)

(72) Inventors: Daniel R. Bestor, Schaumburg, IL (US); Chun Mun Tan, Segamat (MY); Wai Loon Tham, Bayan Lepas (MY); Chew Yee Kee, Alor Setar (MY); Chin Kuan Ong, Butterworth (MY); Mariya Bondareva, Bollingbrook, IL (US); Han Zhong Tan, Butterworth (MY); Li Li Chuah, Gelugor (MY); Wei Han Tan, Bayan Lepas (MY); Benjamin Zaslow, Chicago, IL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 0 days.

(21) Appl. No.: 15/701,470

(22) Filed: Sep. 12, 2017

(65) Prior Publication Data
US 2019/0082304 A1 Mar. 14, 2019

(51) Int. Cl.
*H04W 4/10* (2009.01)
*H04L 29/06* (2006.01)
(Continued)

(52) U.S. Cl.
CPC ........ *H04W 4/10* (2013.01); *G06F 16/90332* (2019.01); *G06Q 50/26* (2013.01);
(Continued)

(58) Field of Classification Search
CPC ......... H04W 4/10; H04W 76/45; H04W 4/20; H04L 65/1069
See application file for complete search history.

(56) References Cited

U.S. PATENT DOCUMENTS 5,473,605 A  12/1995  Grube et al.
7,747,719 B1  6/2010  Horvitz et al.
(Continued)

FOREIGN PATENT DOCUMENTS

WO  2016191653 A1  12/2016

OTHER PUBLICATIONS

Robert Popp and John Poindexter: "Countering Terrorism through Information and Privacy Protection Technologies", IEEE Security & Privacy vol. 4 Issue: 6, 2006, pp. 18-27.
(Continued)

*Primary Examiner* — Dong-Chang Shiue
(74) *Attorney, Agent, or Firm* — Raguraman Kumaresan

(57) ABSTRACT

Method and device for responding to an audio inquiry. The electronic computing device monitors audio communications transmitted between communication devices that are members of a talk group on a talk group channel. The electronic computing device detects an audio inquiry from a first communication device and generates an audio content response to be provided in response to the audio inquiry. The electronic computing device determines based on one or both of the audio inquiry and the audio content response, and as a function of the context information, that the audio content response is to be individually provided to the first communication device. The electronic computing device then establishes a private call with the first communication device and provides the audio content response to the first communication device via the private call.

25 Claims, 9 Drawing Sheets

(51) Int. Cl.
*H04W 4/20* (2018.01)
*H04W 76/45* (2018.01)
*G06Q 50/26* (2012.01)
*G10L 15/22* (2006.01)
*H04M 3/493* (2006.01)
*H04M 3/56* (2006.01)
*H04W 4/08* (2009.01)
*G06F 16/9032* (2019.01)
*H04W 84/08* (2009.01)
*H04W 4/90* (2018.01)

(52) U.S. Cl.
CPC .......... *G10L 15/22* (2013.01); *H04L 65/1069* (2013.01); *H04L 65/4015* (2013.01); *H04L 65/4061* (2013.01); *H04M 3/493* (2013.01); *H04M 3/564* (2013.01); *H04W 4/08* (2013.01); *H04W 4/20* (2013.01); *H04W 76/45* (2018.02); *G10L 2015/223* (2013.01); *G10L 2015/227* (2013.01); *H04M 2203/205* (2013.01); *H04M 2203/2044* (2013.01); *H04W 4/90* (2018.02); *H04W 84/08* (2013.01)

(56) References Cited

U.S. PATENT DOCUMENTS

| | | | |
|---|---|---|---|
| 7,748,027 | B2 | 6/2010 | Patrick |
| 9,021,561 | B2 | 4/2015 | Agulnik et al. |
| 9,058,813 | B1 | 6/2015 | Blanksteen |
| 2009/0017802 | A1* | 1/2009 | Zhang .................... H04W 4/16 455/414.1 |
| 2014/0149322 | A1 | 5/2014 | Lavoie et al. |
| 2015/0117397 | A1* | 4/2015 | Ofir ........................ H04L 65/60 370/331 |
| 2016/0183065 | A1* | 6/2016 | Du .......................... H04W 4/10 370/312 |
| 2016/0205517 | A1* | 7/2016 | Luo ........................ H04W 4/16 455/518 |
| 2016/0352567 | A1* | 12/2016 | Robbins .............. H04L 41/0806 |

OTHER PUBLICATIONS

The International Search Report and the Written Opinion, corresponding patent serial No. PCT/US2018/048489 filed Aug. 29, 2018, dated Nov. 16, 2018 all pages.

\* cited by examiner

METHOD AND DEVICE FOR RESPONDING TO AN AUDIO INQUIRY

BACKGROUND OF THE INVENTION

Tablets, laptops, phones (for example, cellular or satellite), mobile (vehicular) or portable (personal) two-way radios, and other communication devices are now in common use by users, such as first responders (including firemen, police officers, and paramedics, among others), and provide such users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such communication devices further comprise, or provide access to, electronic digital assistants (or sometimes referenced as "virtual partners") that may provide the user thereof with valuable information in an automated (for example, without further user input) or semi-automated (for example, with some further user input) fashion. The valuable information provided to the user may be based on explicit requests for such information posed by the user via an input (for example, such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
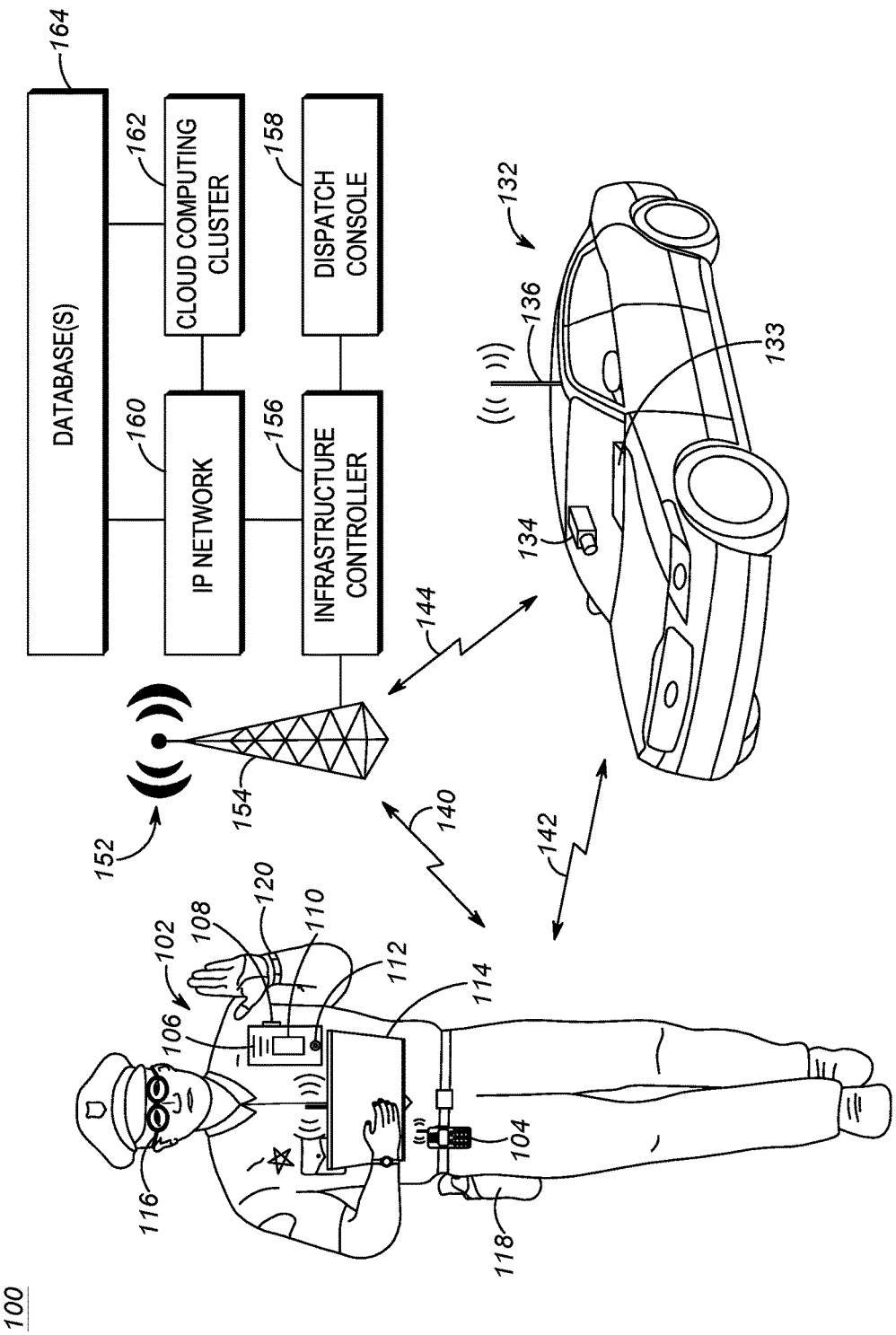
FIG. 1 is a system diagram illustrating a system for operating an electronic digital assistant, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In public safety communication systems, communication devices are often affiliated to different communication groups (also referred to as talk groups) to perform group communication. Group communication functionality allows a communication device (also referred to as a talk group member) to simultaneously communicate with multiple other devices that are associated with the same communication group. This avoids the need for communication devices to repeat the same message or establish different communication sessions to communicate the same message to other devices. In communication devices such as land mobile radios, a push to talk (PTT) interface is implemented to allow a user of the radio to press the push to talk interface to transmit audio on one or more communication channels (also referred to as a talk group channel) for reception by multiple users associated with the talk group.

In public safety environments, there may be particular members in the talk group who are either in a loud or noisy environment, or who are directing their attention elsewhere, and therefore it is possible that these members may miss certain communications transmitted on the talk group channel. For example, a public safety officer may have been distracted by the environment (e.g. when a suspicious person is spotted or when the officer turned down his radio volume to talk to a person) while critical information is transmitted on the talk group channel. In such cases, the talk group member who may have missed the conversation (e.g. a response provided by another member in the talk group) may key up (for example, by pressing the PTT interface) on the talk group and request to repeat the missed conversation on the talk group channel. In response to this request to repeat the conversation, the dispatcher or another member in the talk group may repeat the content of the missed conversation on the same talk group channel. However, such repetition of previously transmitted conversations increases talk group traffic and also further increases workload on the dispatchers/talk group members repeating the conversation, and may also further negatively impact user experience of other talk group members who may not want to listen to the same conversation again.

Electronic digital assistants are implemented in such communication systems to automatically monitor audio communications exchanged between members of a talk group and provide audio responses to members in the group when an inquiry is detected in the monitored audio communications. Disclosed are a method and device for an electronic digital assistant to respond to an audio inquiry in a talk group. To improve user experience of talk group members and reduce the talk group traffic, such electronic digital assistants are further configured to automatically detect an audio inquiry from a talk group member on the talk group channel and establish a private channel with the requesting talk group member to individually provide audio content response to the talk group member.

One embodiment provides a method for responding to an audio inquiry. The method includes monitoring, at an electronic computing device, audio communications transmitted between a plurality of communication devices on a talk group channel, wherein the plurality of communication devices are members of a talk group associated with the talk group channel; detecting, at the electronic computing device, from the audio communications, an audio inquiry from a first communication device of the plurality of communication devices; processing, at the electronic computing device, the audio inquiry and generating an audio content response to be provided in response to the audio inquiry; obtaining, at the electronic computing device, context information corresponding to the first communication device; determining, at the electronic computing device, based on one or both of the audio inquiry and the audio content response, and as a function of the context information, that the audio content response is to be individually provided to the first communication device; and establishing, at the electronic computing device, a private call with the first communication device and providing the audio content response to the first communication device via the private call.

Another embodiment provides an electronic computing device that includes an electronic processor and a communication interface communicatively coupled to the electronic processor. The electronic processor is configured to monitor, audio communications transmitted between a plurality of communication devices on a talk group channel, wherein the plurality of communication devices are members of a talk group associated with the talk group channel, detect, from the audio communications, an audio inquiry from a first communication device of the plurality of communication devices; process the audio inquiry and generating an audio content response to be provided in response to the audio inquiry, obtain context information corresponding to the first communication device, determine based on one or both of the audio inquiry and the audio content response, and as a function of the context information, that the audio content response is to be individually provided to the first communication device, and establish, using the communication interface, a private call with the first communication device and provide the audio content response to the first communication device via the private call.

Each of the above-mentioned embodiments will be discussed in more detail below, starting with example communication system and device architectures of the system in which the embodiments may be practiced, followed by an illustration of processing steps for achieving the method, device, and system for an electronic digital assistant. Further advantages and features consistent with this disclosure will be set forth in the following detailed description, with reference to the figures.

1. Communication System and Device Structures a. Communication System Structure

Figure 2:
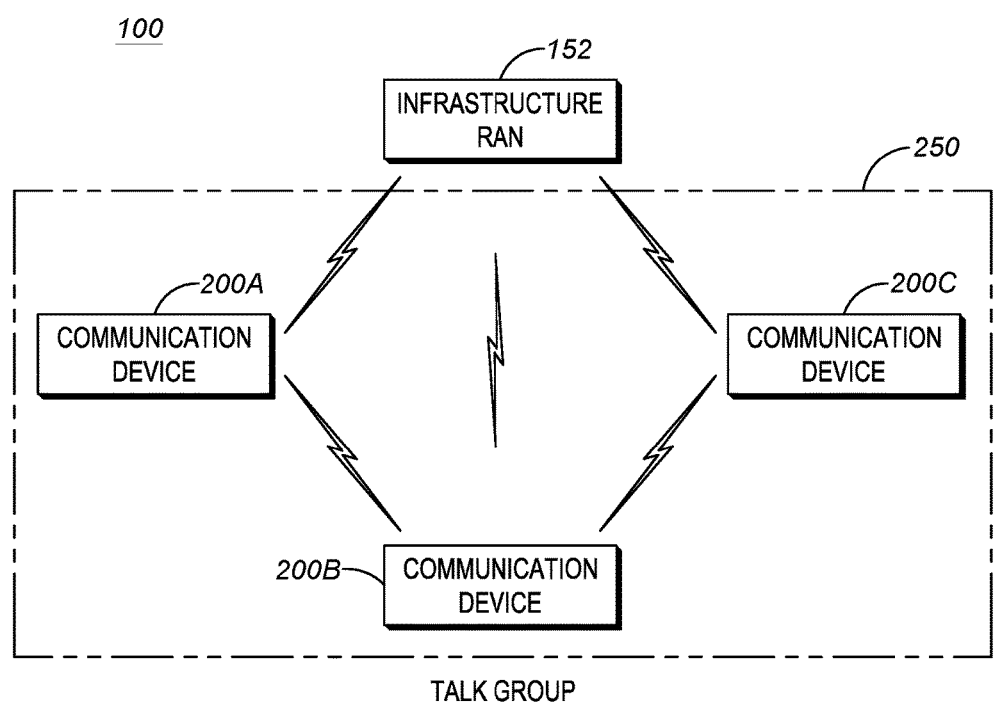
FIG. 2 is a system diagram illustrating a plurality of communication devices of FIG. 1 that are associated with a talk group, in accordance with some embodiments.

Referring now to the drawings, and in particular FIGS. 1 and 2, a communication system 100 is shown including a first set of devices that a user 102 (illustrated in FIG. 1 as a first responder police officer) may wear, such as a primary battery-powered portable radio 104 used for narrowband and/or broadband direct-mode or infrastructure communications, a battery-powered radio speaker microphone (RSM) video capture device 106, a laptop 114 having an integrated video camera and used for data applications such as incident support applications, smart glasses 116 (for example, which may be virtual reality, augmented reality, or mixed reality glasses), sensor-enabled holster 118, and/or biometric sensor wristband 120. Although FIG. 1 illustrates only a single user 102 with a respective first set of devices, in other embodiments, the single user 102 may include additional sets of same or similar devices, and additional users may be present with respective additional sets of same or similar devices as indicated by FIG. 2.

System 100 may also include a vehicle 132 associated with the user 102 having an integrated mobile communication device 133, an associated vehicular video camera 134, and a coupled vehicular transceiver 136. Although FIG. 1 illustrates only a single vehicle 132 with a single mobile communication device 133, respective single vehicular video camera 134 and/or microphone, and a single coupled vehicular transceiver 136, in other embodiments, the vehicle 132 may include additional same or similar mobile communication devices, video cameras, microphones, and/or transceivers, and additional vehicles may be present with respective additional sets of mobile communication devices, video cameras, microphones, and/or transceivers.

Each of the portable radio 104, RSM video capture device 106, laptop 114, and vehicular mobile communication device 133 may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits. These devices are configured to receive inputs associated with the user 102 and/or provide outputs to the user 102 in addition to communicating information to and from other communication devices and the infrastructure RAN 152.

Many of the devices shown in FIG. 1 (such as the portable radio 104, the RSM video capture device 106, the laptop 114, the mobile communication device 133, the infrastructure controller 156, dispatch console 158, and one or more computing devices in the cloud computing cluster 162) may be referred to as communication devices (for example, communication devices 200A, 200B, 200C shown in FIG. 2). Although FIG. 1 shows multiple communication devices 200 associated with the user 102, in some embodiments, the communication system 100 includes communication devices 200 of multiple users. For example, as shown in FIG. 2, the communication device 200A is associated with a first user, the communication device 200B is associated with a second user, and the communication device 200C is associated with a third user. Further, as shown in FIG. 2, the communication devices 200A, 200B, and 200C are members of the same talk group i.e. talk group 250. Although not shown in FIG. 2, each of the communication devices 200A, 200B, 200C may also be associated with one or more talk groups other than the talk group 250. The communication devices 200A, 200B, 200C will be interchangeably referred to hereafter, collectively, as communication devices 200 or device 200, and generically as a communication device 200 or device 200. In some embodiments, the communication devices 200 communicate with each other over the infrastructure RAN 152 and/or communicate with each other directly as described herein. Similarly, other devices, such as the dispatch console 158, may communicate with communication devices 200 of multiple users through the infrastructure RAN 152. In some embodiments, one or more users may have multiple associated communication devices 200, for example, as shown in FIG. 1.

Referring back to FIG. 1, the portable radio 104, in particular, may be any communication device 200 used for infrastructure RAN or direct-mode media (for example, voice, audio, video, etc.) communication via a long-range wireless transmitter and/or transceiver that has a transmitter transmit range on the order of miles, for example, 0.5-50 miles, or 3-20 miles (for example, in comparison to a short-range transmitter such as a Bluetooth, Zigbee, or NFC transmitter) with other communication devices and/or the infrastructure RAN 152. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long range transmitter may implement a Wi-Fi protocol perhaps in accordance with an IEEE 802.11 standard (for example, 802.11a, 802.11b, 802.11g) or a WiMAX protocol perhaps operating in accordance with an IEEE 802.16 standard.

In the example of FIG. 1, the portable radio 104 may form the hub of communication connectivity for the user 102, through which other accessory devices, such as a biometric sensor (for example, the biometric sensor wristband 120), an activity tracker, a weapon status sensor (for example, the sensor-enabled holster 118), a heads-up-display (for example, the smart glasses 116), the RSM video capture device 106, and/or the laptop 114 may communicatively couple.

In order to communicate with and exchange video, audio, and other media and communications with the RSM video capture device 106, laptop 114, and/or smart glasses 116, the portable radio 104 may contain one or more physical electronic ports (such as a universal serial bus (USB) port, an Ethernet port, an audio jack, etc.) for direct electronic coupling with the RSM video capture device 106, laptop 114, and/or smart glasses 116. In some embodiments, the portable radio 104 may contain a short-range transmitter (for example, in comparison to the long-range transmitter such as a LMR or Broadband transmitter) and/or transceiver for wirelessly coupling with the RSM video capture device 106, laptop 114, and/or smart glasses 116. The short-range transmitter may be a Bluetooth, Zigbee, or near field communication (NFC) transmitter having a transmit range on the order of 0.01-100 meters, or 0.1-10 meters. In other embodiments, the RSM video capture device 106, the laptop 114, and/or the smart glasses 116 may contain their own long-range transceivers and may communicate with one another and/or with the infrastructure RAN 152 or vehicular transceiver 136 directly without passing through portable radio 104.

The RSM video capture device 106 provides voice functionality features similar to a traditional RSM, including one or more of acting as a remote microphone that is closer to the user's 102 mouth, providing a remote speaker allowing playback of audio closer to the user's 102 ear, and including a PTT switch/interface or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other communication devices or to the infrastructure RAN 152. The voice and/or audio played back at the remote speaker may be received from the portable radio 104 or received directly from one or more other communication devices or the infrastructure RAN 152. The RSM video capture device 106 may include a separate physical PTT switch 108 that functions, in cooperation with the portable radio 104 or on its own, to maintain the portable radio 104 and/or RSM video capture device 106 in a monitor only mode, and which switches the device(s) to a transmit-only mode (for half-duplex devices) or transmit and receive mode (for full-duplex devices) upon depression or activation of the PTT switch 108. The portable radio 104 and/or RSM video capture device 106 may form part of a group communications architecture (such as a talk group 250 shown in FIG. 2) that allows a single communication device to communicate with one or more group members (not shown) associated with a particular group of devices at a same time.

Additional features may be provided at the RSM video capture device 106 as well. For example, a display screen 110 may be provided for displaying images, video, and/or text to the user 102 or to someone else. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may also be provided at the RSM video capture device 106, integrating an ability to capture images and/or video and store the captured image data (for further analysis) or transmit the captured image data as an image or video stream to the portable radio 104 and/or to other communication devices or to the infrastructure RAN 152 directly. The video camera 112 and RSM remote microphone may be used, for example, for capturing audio and/or video of a field-of-view associated with the user 102, perhaps including a suspect and the suspect's surroundings, storing the captured image and/or audio data for further analysis or transmitting the captured audio and/or video data as an audio and/or video stream to the portable radio 104 and/or to other communication devices or to the infrastructure RAN 152 directly for further analysis. An RSM remote microphone of the RSM video capture device 106 may be an omni-directional or unidirectional microphone or array of omni-directional or unidirectional microphones that may be capable of identifying a direction from which a captured sound emanated.

In some embodiments, the RSM video capture device 106 may be replaced with a more limited body worn camera that may include the video camera 112 and/or microphone noted above for capturing audio and/or video, but may forego one or more of the features noted above that transform the body worn camera into a more full featured RSM, such as the separate physical PTT switch 108 and the display screen 110, and remote microphone functionality for voice communications in cooperation with portable radio 104.

The laptop 114, in particular, may be any wireless communication device used for infrastructure RAN or direct-mode media communication via a long-range or short-range wireless transmitter with other communication devices and/or the infrastructure RAN 152. The laptop 114 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, and/or other types of applications that may require user interaction to operate. The laptop 114 display screen may be, for example, an LCD screen or an OLED display screen. In some embodiments, a touch sensitive input interface may be incorporated into the display screen as well, allowing the user 102 to interact with content provided on the display screen. A soft PTT input may also be provided, for example, via such a touch interface.

Front and/or rear-facing video cameras may also be provided at the laptop 114, integrating an ability to capture video and/or audio of the user 102 and the user's 102 surroundings, perhaps including a field-of-view of the user 102 and/or a suspect (or potential suspect) and the suspect's surroundings, and store and/or otherwise process the captured video and/or audio for further analysis or transmit the captured video and/or audio as a video and/or audio stream to the portable radio 104, other communication devices, and/or the infrastructure RAN 152 for further analysis.

The smart glasses 116 may include a digital imaging device, an electronic processor, a short-range and/or long-range transceiver device, and/or a projecting device. The smart glasses 116 may maintain a bi-directional connection with the portable radio 104 and provide an always-on or on-demand video feed pointed in a direction of the user's 102 gaze via the digital imaging device, and/or may provide a personal display via the projection device integrated into the smart glasses 116 for displaying information such as text, images, or video received from the portable radio 104 or directly from the infrastructure RAN 152. In some embodiments, the smart glasses 116 may include its own long-range transceiver and may communicate with other communication devices and/or with the infrastructure RAN 152 or vehicular transceiver 136 directly without passing through portable radio 104. In some embodiments, an additional user interface mechanism such as a touch interface or gesture detection mechanism may be provided at the smart glasses 116 that allows the user 102 to interact with the display elements displayed on the smart glasses 116 or projected into the user's 102 eyes, or to modify operation of the digital imaging device. In other embodiments, a display and input interface at the portable radio 104 may be provided for interacting with smart glasses 116 content and modifying operation of the digital imaging device, among other possibilities.

The smart glasses 116 may provide a virtual reality interface in which a computer-simulated reality electronically replicates an environment with which the user 102 may interact. In some embodiments, the smart glasses 116 may provide an augmented reality interface in which a direct or indirect view of real-world environments in which the user is currently disposed are augmented (that is, supplemented, by additional computer-generated sensory input such as sound, video, images, graphics, GPS data, or other information). In still other embodiments, the smart glasses 116 may provide a mixed reality interface in which electronically generated objects are inserted in a direct or indirect view of real-world environments in a manner such that they may co-exist and interact in real time with the real-world environment and real world objects.

The sensor-enabled holster 118 may be an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 may also detect whether the first responder's hand is resting on the weapon even if it has not yet been removed from the holster and provide such information to portable radio 104. In some embodiments, a weapon of the user 102 may include a sensor that detects when the weapon is discharged. The detected discharge may be reported to the portable radio 104, for example. Other possibilities exist as well.

The biometric sensor wristband 120 may be an electronic device for tracking an activity of the user 102 or a health status of the user 102, and may include one or more movement sensors (such as an accelerometer, magnetometer, and/or gyroscope) that may periodically or intermittently provide to the portable radio 104 indications of orientation, direction, steps, acceleration, and/or speed, and indications of health such as one or more of a captured heart rate, a captured breathing rate, and a captured body temperature of the user 102, perhaps accompanying other information. In some embodiments, the biometric sensor wristband 120 may include its own long-range transceiver and may communicate with other communication devices and/or with the infrastructure RAN 152 or vehicular transceiver 136 directly without passing through portable radio 104.

An accelerometer is a device that measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

The heart rate sensor may use electrical contacts with the skin to monitor an electrocardiography (EKG) signal of its wearer, or may use infrared light and imaging device to optically detect a pulse rate of its wearer, among other possibilities.

A breathing rate sensor may be integrated within the sensor wristband 120 itself, or disposed separately and communicate with the sensor wristband 120 via a short range wireless or wired connection. The breathing rate sensor may include use of differential capacitive circuits or capacitive transducers to measure chest displacement and thus breathing rates. In other embodiments, a breathing sensor may monitor a periodicity of mouth and/or nose-exhaled air (for example, using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

Although the biometric sensor wristband 120 is shown in FIG. 1 as a bracelet worn around the wrist, in other examples, the biometric sensor wristband 120 may additionally and/or alternatively be worn around another part of the body, or may take a different physical form including an earring, a finger ring, a necklace, a glove, a belt, or some other type of wearable, ingestible, or insertable form factor. In some embodiments, the biometric sensor wristband 120 or another device of the user 102 may detect characteristics of the environment of the user 102 (for example, temperature, humidity, air quality, and the like).

The portable radio 104, RSM video capture device 106, laptop 114, smart glasses 116, sensor-enabled holster 118, and/or biometric sensor wristband 120 may form a personal area network (PAN) via corresponding short-range PAN transceivers, which may be based on a Bluetooth, Zigbee, Bluetooth Low Energy, WiFi, Near Field Communication (NFC), Radio Frequency ID (RFID) or other short-range wireless protocol having a transmission range on the order of meters, tens of meters, or hundreds of meters.

The portable radio 104 and/or RSM video capture device 106 (or any other device in FIG. 1, for that matter) may each include a location determination device integrated with or separately disposed in the portable radio 104 and/or RSM 106 and/or in respective receivers, transmitters, or transceivers of the portable radio 104 and RSM 106 for determining a location of the portable radio 104 and RSM 106. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 associated with the user 102 may include the mobile communication device 133, the vehicular video camera 134 and/or microphone, and the vehicular transceiver 136, all of which may be coupled to one another via a wired and/or wireless vehicle area network (VAN), perhaps along with other sensors physically or communicatively coupled to the vehicle 132. The vehicular transceiver 136 may include a long-range transceiver for directly wirelessly communicating with communication devices such as the portable radio 104, the RSM 106, and the laptop 114 via wireless link(s) 142 and/or for wirelessly communicating with the RAN 152 via wireless link(s) 144. The vehicular transceiver 136 may further include a short-range wireless transceiver or wired transceiver for communicatively coupling between the mobile communication device 133 and/or the vehicular video camera 134 in the VAN. The mobile communication device 133 may, in some embodiments, include the vehicular transceiver 136 and/or the vehicular video camera 134 integrated therewith, and may operate to store and/or process video and/or audio produced by the video camera 134 and/or transmit the captured video and/or audio as a video and/or audio stream to the portable radio 104, other communication devices, and/or the infrastructure RAN 152 for further analysis. A microphone (not shown), or an array thereof, may be integrated in the video camera 134 and/or at the mobile communication device 133 (or additionally or alternatively made available at a separate location of the vehicle 132) and communicatively coupled to the mobile communication device 133 and/or vehicular transceiver 136 for capturing audio and storing, processing, and/or transmitting the audio in a same or similar manner to the video as set forth above. The omni-directional or uni-directional microphone, or an array thereof, may be integrated in the video camera 134 and/or at the mobile communication device 133 (or additionally or alternatively made available at a separate location of the vehicle 132) and communicably coupled to the mobile communication device 133 and/or vehicular transceiver 136 for capturing audio and storing, processing, and/or transmitting the audio in a same or similar manner as set forth above with respect to the RSM 106.

The vehicle 132 may be a human-operable vehicle, or may be a self-driving vehicle operable under control of the mobile communication device 133 perhaps in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN and/or the PAN (when the PAN is in range of the VAN or via the VAN's infrastructure RAN link). In some embodiments, devices within the vehicle 132 may communicate with devices in other vehicles via a Vehicular to Vehicular (V2V) Network.

The vehicle 132 and/or transceiver 136, similar to the portable radio 104 and/or respective receivers, transmitters, or transceivers thereof, may include a location (and/or orientation) determination device integrated with or separately disposed in the mobile communication device 133 and/or transceiver 136 for determining (and storing and/or transmitting) a location (and/or orientation) of the vehicle 132.

In some embodiments, instead of a vehicle 132, a land, air, or water-based drone with the same or similar audio and/or video and communications capabilities and the same or similar self-navigating capabilities as set forth above may be disposed, and may similarly communicate with the user's 102 PAN and/or with the infrastructure RAN 152 to support the user 102 in the field.

The VAN may communicatively couple with the PAN disclosed above when the VAN and the PAN come within wireless transmission range of one another, perhaps after an authentication takes place there between. In some embodiments, one of the VAN and the PAN may provide infrastructure communications to the other, depending on the situation and the types of devices in the VAN and/or PAN and may provide interoperability and communication links between devices (such as video cameras) and sensors within the VAN and PAN.

Although the RSM 106, the laptop 114, and the vehicle 132 are illustrated in FIG. 1 as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

In some embodiments, one or more of the user 102, the vehicle 132, the portable radio 104, the RSM video capture device 106, and any other device in FIG. 1 may be equipped with an environmental sensor such as a chemical, biological, radiological, nuclear, or explosive (CBRNE) sensor. Measurements made by the CBRNE sensor may be stored locally or transmitted via a transmitter or transceiver to other communication devices and/or to the infrastructure RAN 152.

Infrastructure RAN 152 is a radio access network that provides for radio communication links to be arranged within the network between a plurality of communication devices. Such communication devices may be portable, mobile, or stationary and may include any one or more of the communication devices illustrated in FIG. 1, among other possibilities. At least one other terminal, for example used in conjunction with the communication devices, may be a fixed terminal, for example a base station, eNodeB, repeater, and/or access point. Such a RAN typically includes a system infrastructure that generally includes a network of various fixed terminals, which are in direct radio communication with the communication devices. Each of the fixed terminals operating in the RAN 152 may have one or more transceivers which may, for example, serve communication devices in a given region or area, known as a 'cell' or 'site', by radio frequency (RF) communication. The communication devices that are in direct communication with a particular fixed terminal are said to be served by the fixed terminal. In one example, all radio communications to and from each communication device within the RAN 152 are made via respective serving fixed terminals. Sites of neighboring fixed terminals may be offset from one another and may provide corresponding non-overlapping or partially or fully overlapping RF coverage areas.

Infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally or alternatively, infrastructure RAN 152 may implement a wireless local area network (WLAN) technology such as Wi-Fi perhaps operating in accordance with an IEEE 802.11 standard (for example, 802.11a, 802.11b, 802.11g) or such as a WiMAX perhaps operating in accordance with an IEEE 802.16 standard.

Infrastructure RAN 152 may additionally or alternatively operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half duplex communication devices, but uses communication devices operating over modern broadband telecommunications networks. Using PoC, wireless communication devices such as mobile telephones and notebook computers can function as PTT half-duplex communication devices for transmitting and receiving. Other types of PTT models and multimedia call models (MMCMs) are also available.

Floor control in an OMA-PoC session is generally maintained by a PTT server (also referred to as a talk group server) that controls communications between two or more wireless communication devices. When a user of one of the communication devices keys a PTT button, a request for permission to speak in the OMA-PoC session is transmitted from the user's communication device to the PTT server using, for example, a real-time transport protocol (RTP) message. If no other users are currently speaking in the PoC session, an acceptance message is transmitted back to the user's communication device and the user may then speak into a microphone of the communication device. Using standard compression/decompression (codec) techniques, the user's voice is digitized and transmitted using discrete auditory data packets (for example, together which form an auditory data stream over time), such as according to RTP and internet protocols (IP), to the PTT server. The PTT server then transmits the auditory data packets to other users of the PoC session (for example, to other communication devices in the group of communication devices or talkgroup to which the user is subscribed), using for example, one or more of a unicast, point to multipoint, or broadcast communication technique.

Infrastructure narrowband LMR wireless systems, on the other hand, operate in either a conventional or trunked configuration. In either configuration, a plurality of communication devices is partitioned into separate groups of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (for example, talkgroups). Thus, all groups are served by all channels. The trunked radio system works to take advantage of the probability that not all groups need a traffic channel for communication at the same time. When a member of a group requests a call on a control or rest channel on which all of the communication devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the communication devices were idling to a traffic channel for the call, and instruct all communication devices that are not participating in the new call to move to a newly assigned control or rest channel selected from the pool of available channels. With a given number of channels, a much greater number of groups may be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (for example, communication devices) could be provisioned in the network by the user or an agent, and then provided some form of group identity or identifier, for example. Then, at a future time, an originating user in a group may cause some signaling to be transmitted indicating that he or she wishes to establish a communication session (for example, group call) with each of the pre-designated participants in the defined group. In another example, communication devices may dynamically affiliate with a group (and also disassociate with the group) perhaps based on user input, and the switching and/or radio network may track group membership and route new group calls according to the current group membership.

In some instances, broadband and narrowband systems may be interfaced via a middleware system that translates between a narrowband PTT standard protocol (such as P25) and a broadband PTT standard protocol or application (such as OMA-PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 1, such a middleware server may be disposed in infrastructure RAN 152 at infrastructure controller 156 or at a separate cloud computing cluster 162 communicably coupled to infrastructure controller 156 via internet protocol (IP) network 160, among other possibilities.

The infrastructure RAN 152 is illustrated in FIG. 1 as providing coverage for the portable radio 104, RSM video capture device 106, laptop 114, smart glasses 116, and/or vehicle transceiver 136 via a single fixed terminal 154 coupled to a single infrastructure controller 156 (for example, a radio controller, call controller, PTT server, zone controller, MME, BSC, MSC, site controller, Push-to-Talk controller, or other network device) and including the dispatch console 158 operated by a dispatcher. In other embodiments, additional fixed terminals and additional controllers may be disposed to support a larger geographic footprint and/or a larger number of mobile devices.

The infrastructure controller 156 illustrated in FIG. 1, or some other back-end infrastructure device or combination of back-end infrastructure devices existing on-premises or in the remote cloud computing cluster 162 accessible via the IP network 160 (such as the Internet), may additionally or alternatively operate as a back-end electronic digital assistant, a back-end audio and/or video processing device, and/or a remote cloud-based storage device consistent with the remainder of this disclosure.

The IP network 160 may comprise one or more routers, switches, LANs, WLANs, WANs, access points, or other network infrastructure, including but not limited to, the public Internet. The cloud computing cluster 162 may be comprised of a plurality of computing devices, such as the one set forth in FIG. 2, one or more of which may be executing none, all, or a portion of an electronic digital assistant service, sequentially or in parallel, across the one or more computing devices. The one or more computing devices comprising the cloud computing cluster 162 may be geographically co-located or may be separated by inches, meters, or miles, and inter-connected via electronic and/or optical interconnects. Although not shown in FIG. 1, one or more proxy servers or load balancing servers may control which one or more computing devices perform any part or all of the electronic digital assistant service.

As shown in FIG. 1, database(s) 164 may be accessible via the IP network 160 and/or the cloud computing cluster 162. As shown in FIG. 1, the databases 164 are communicatively coupled with the infrastructure RAN 152 to allow the communication devices (for example, the portable radio 104, the RSM video capture device 106, the laptop 114, and the mobile communication device 133) to communicate with and retrieve data from the databases 164 via infrastructure controller 156 and IP network 160. In some embodiments, the databases 164 are commercial cloud-based storage devices. In some embodiments, the databases 164 are housed on suitable on-premises database servers. The database(s) may include databases such as a long-term video storage database, a historical or forecasted weather database, an offender database perhaps including facial recognition images to match against, a cartographic database of streets and elevations, a traffic database of historical or current traffic conditions, incident database including data such as incident assignment and timeline of incidents, or other types of databases. Databases 164 may further include all or a portion of the databases described herein as being provided at the infrastructure controller 156. In some embodiments, the databases 164 may be maintained by third parties (for example, the National Weather Service or a Department of Transportation, respectively). The databases 164 of FIG. 1 are merely examples. In some embodiments, the system 100 additionally or alternatively includes other databases that store different information. In some embodiments, the databases 164 and/or additional or other databases are integrated with, or internal to, the infrastructure controller 156.

Finally, although FIG. 1 describes a communication system 100 generally as a public safety communication system that includes a user 102 generally described as a police officer and a vehicle 132 generally described as a police cruiser, in other embodiments, the communication system 100 may additionally or alternatively be a retail communication system including a user 102 that may be an employee of a retailer and a vehicle 132 that may be a vehicle for use by the user 102 in furtherance of the employee's retail duties (for example, a shuttle or self-balancing scooter). In other embodiments, the communication system 100 may additionally or alternatively be a warehouse communication system including a user 102 that may be an employee of a warehouse and a vehicle 132 that may be a vehicle for use by the user 102 in furtherance of the employee's retail duties (for example, a forklift). In still further embodiments, the communication system 100 may additionally or alternatively be a private security communication system including a user 102 that may be an employee of a private security company and a vehicle 132 that may be a vehicle for use by the user 102 in furtherance of the private security employee's duties (for example, a private security vehicle or motorcycle). In even further embodiments, the communication system 100 may additionally or alternatively be a medical communication system including a user 102 that may be a doctor or nurse of a hospital and a vehicle 132 that may be a vehicle for use by the user 102 in furtherance of the doctor or nurse's duties (for example, a medical gurney or ambulance). In still another example embodiment, the communication system 100 may additionally or alternatively be a heavy machinery communication system including a user 102 that may be a miner, driller, or extractor at a mine, oil field, or precious metal or gem field and a vehicle 132 that may be a vehicle for use by the user 102 in furtherance of the miner, driller, or extractor's duties (for example, an excavator, bulldozer, crane, front loader). Other possibilities exist as well.

b. Device Structure

Figure 3:
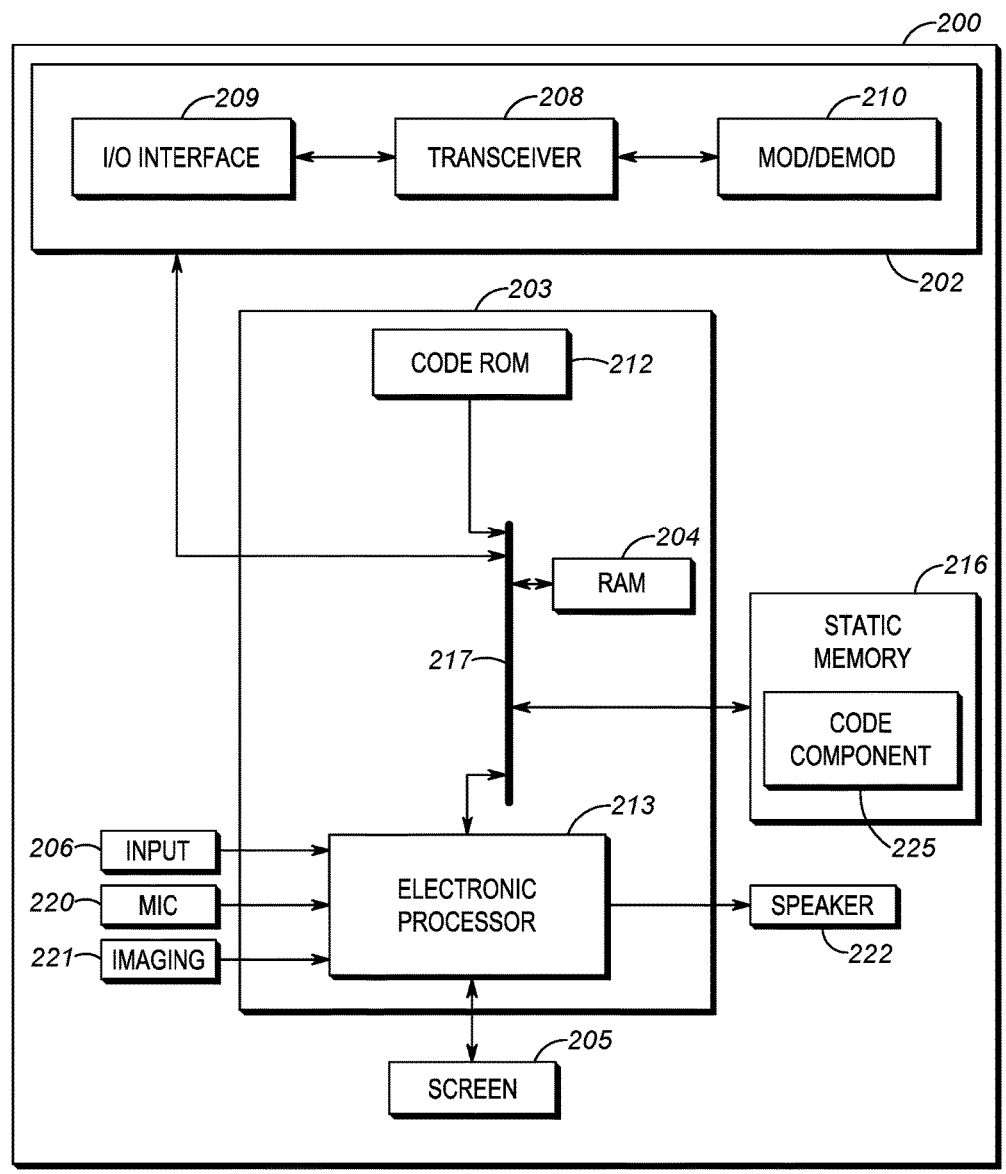
FIG. 3 is a device diagram showing a device structure of a communication device of the system of FIGS. 1 and 2 in accordance with some embodiments.

FIG. 3 sets forth a schematic diagram that illustrates a communication device 200 according to some embodiments of the present disclosure. The communication device 200 may be, for example, embodied in the portable radio 104, the RSM video capture device 106, the laptop 114, the mobile communication device 133, the infrastructure controller 156, the dispatch console 158, one or more computing devices in the cloud computing cluster 162, or some other communication device not illustrated in FIG. 1, and/or may be a distributed communication device across two or more of the foregoing (or multiple of a same type of one of the foregoing) and linked via a wired and/or wireless communication link(s). In some embodiments, the communication device 200 (for example, the portable radio 104) may be communicatively coupled to other devices such as the sensor-enabled holster 118 as described above. In such embodiments, the combination of the portable radio 104 and the sensor-enabled holster 118 may be considered a single communication device 200.

While FIG. 3 represents the communication devices 200 described above with respect to FIGS. 1 and 2, depending on the type of the communication device, the communication device 200 may include fewer or additional components in configurations different from that illustrated in FIG. 3. For example, in some embodiments, the communication device 200 acting as the infrastructure controller 156 may not include one or more of the screen 205, microphone 220, imaging device 221, and speaker 222. As another example, in some embodiments, the communication device 200 acting as the portable radio 104 of the RSM video capture device 106 may further include a location determination device (for example, a global positioning system (GPS) receiver) as explained above. Other combinations are possible as well.

As shown in FIG. 3, the communication device 200 includes a communications unit 202 coupled to a common data and address bus 217 of a processing unit 203. The communication device 200 may also include one or more input devices (for example, keypad, pointing device, touch-sensitive surface, button, a microphone 220, an imaging device 221, and/or another input device 206) and an electronic display screen 205 (which, in some embodiments, may be a touch screen and thus also acts as an input device), each coupled to be in communication with the processing unit 203.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. The imaging device 221 may provide video (still or moving images) of an area in a field of view of the communication device 200 for further processing by the processing unit 203 and/or for further transmission by the communications unit 202. A speaker 222 may be present for reproducing audio that is decoded from voice or audio streams of calls received via the communications unit 202 from other portable radios, from digital audio stored at the communication device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices, such as the portable radio 104, the laptop 114, the wireless RAN 152, and/or the mobile communication device 133.

For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The electronic processor 213 has ports for coupling to the display screen 205, the microphone 220, the imaging device 221, the other input device 206, and/or the speaker 222. Static memory 216 may store operating code 225 for the electronic processor 213 that, when executed, performs one or more of the steps set forth in FIG. 4 and the accompanying text. The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

2. Processes for Responding to an Audio Inquiry

In some embodiments, an individual component and/or a combination of individual components of the system 100 may be referred to as an electronic computing device that implements an electronic digital assistant as mentioned above. For example, the electronic computing device may be a single electronic processor (for example, the electronic processor 213 of the portable radio 104). In other embodiments, the electronic computing device includes multiple electronic processors distributed remotely from each other. For example, the electronic computing device may be implemented on a combination of at least two of the electronic processor 213 of the portable radio 104, the electronic processor 213 of the infrastructure controller 156, and the electronic processor 213 of a back-end device in the cloud computing cluster 162 accessible via the IP network 160.

To use the electronic digital assistant implemented by the electronic computing device, the user 102 may, for example, provide an audio inquiry that is received by the microphone 220 of the communication device 200. In accordance with some embodiments, the audio inquiry received at the microphone is further transmitted as audio communications on a talk group channel for receipt by other users in a talk group. The electronic computing device receives signals representative of the audio inquiry (directly from the microphone 220 or through monitoring audio communications on the talk group channel) and analyzes the signals to determine the intent and content of the audio inquiry. For example, the electronic computing device may include a natural language processing (NLP) engine configured to determine the intent and content of the audio inquiry. The electronic computing device may also be configured to determine a response to the audio inquiry (for example, by retrieving stored data or by requesting data from a database such as the databases 164) and provide the response to an output device of the communication device 200 (for example, one or more of the speaker 222 via a generated audio response and the screen 205 via a generated text-based response). In other words, one or more of the communication device 200, embodied in one or more of the communication devices of FIG. 1, such as the portable radio 104, the infrastructure controller 156, and/or cloud computing cluster 162 may include a natural language processing engine to analyze audio inquiries received from the communication device 200 and provide responses to the audio inquiries in the form of audio data, image data, or text data.

Although an audio inquiry is described above, in some embodiments, the electronic computing device receives and responds to other types of queries and inputs. For example, the user 102 may submit a text query to the electronic computing device by typing the text query into a hard keyboard input device or a soft keyboard input provided on the screen 205 of the communication device 200. As another example, the user 102 may use the imaging device 221 to capture an image or video of an area and press a hard or soft key to send the image or video to the electronic computing device to, for example, allow the electronic computing device to identify an object in the image or video.

In accordance with some embodiments, the electronic digital assistant is also added to a talk group (for example, talk group 250) as a talk group member to monitor communications (as well as transmit communications) between communication devices 200 that are members of the talk group. When the electronic computing device implementing the electronic digital assistant detects an audio inquiry, for example, a voice query transmitted on a talk group channel by a particular talk group member, the electronic computing device implementing the electronic digital assistant processes the audio inquiry and responds to the audio inquiry in accordance with a method 400 illustrated in FIG. 4.

Figure 4:
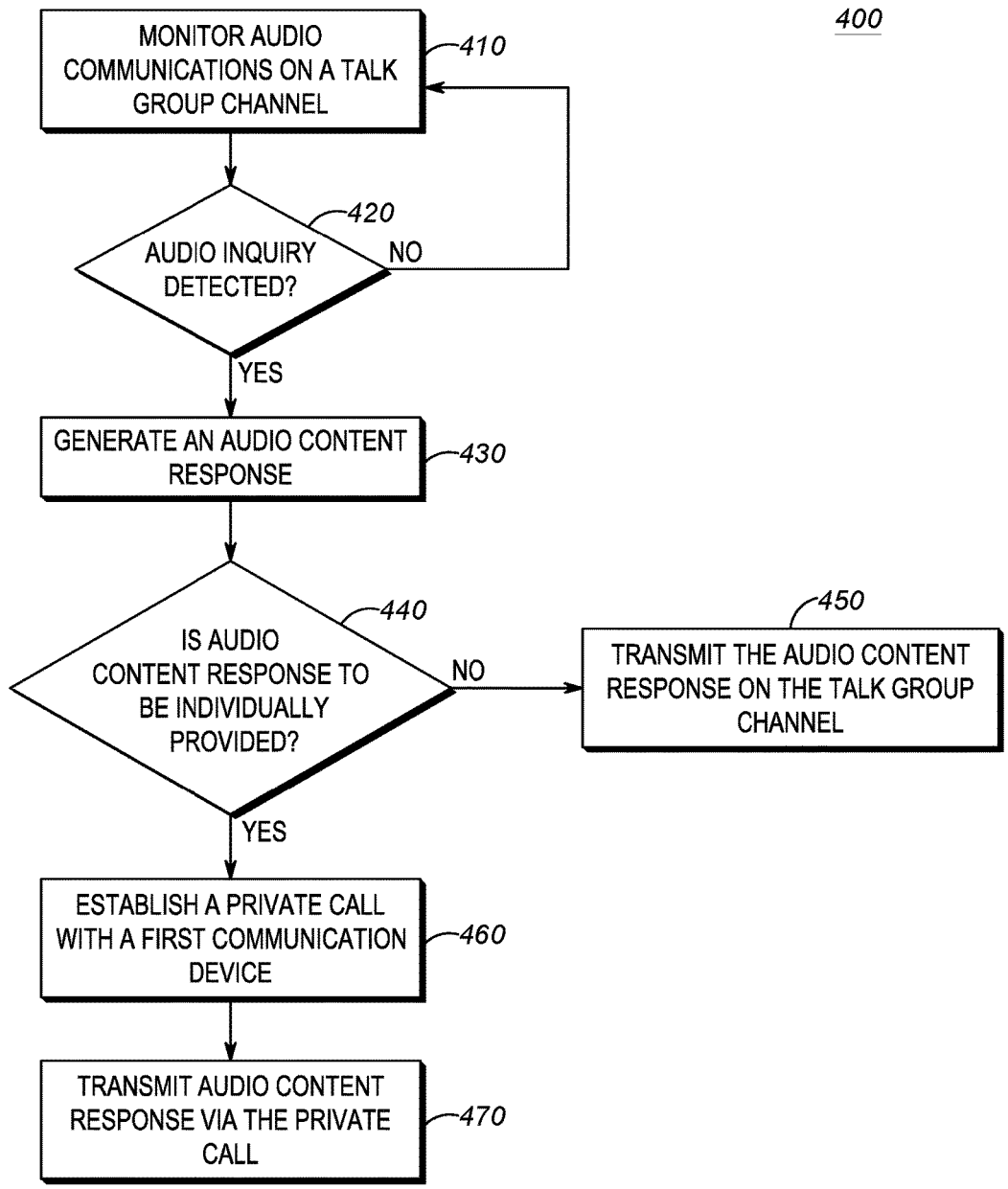
FIG. 4 illustrates a flow chart of a method of responding to an audio inquiry in accordance with some embodiments.

FIG. 4 illustrates a flow chart diagram of the method 400 performed by the electronic computing device for responding to an audio inquiry. While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure.

At block 410, the electronic computing device monitors audio communications transmitted between a plurality of communication devices (for example, communication devices 200A, 200B, 200C shown in FIG. 2) on a talk group channel, wherein the communication devices are members of a talk group (for example, talk group 250) associated with a talk group channel. In accordance with some embodiments, the electronic computing device implementing the electronic digital assistant is added to the talk group as another talk group member that monitors all audio communications transmitted between members of the talk group on the talk group channel. Alternatively, a PTT server that controls the talk group communications may forward the audio communications transmitted on the group call to the electronic computing device to allow the electronic computing device to monitor the audio communications in the talk group. In another embodiment, the electronic computing device (implementing the electronic digital assistant) may be locally implemented at each communication device 200 to monitor the voice query received at a microphone 220 of the communication device 200, for example, prior to the voice query being processed and transmitted as audio communications on the talk group channel associated with the communication device 200.

At block 420, the electronic computing device detects, from the monitored audio communications, an audio inquiry from a first communication device (e.g. communication device 200A) of the plurality of communication devices. For example, the electronic computing device processes the audio communications transmitted on the talk group channel and determines that a user associated with the communication device 200A has an audio inquiry based on the audio communications transmitted from the communication device 200A on the talk group channel. As used herein, the term "audio inquiry" indicates an inquiry from the user requiring response from the electronic digital assistant. The audio inquiry may be a request to repeat a segment of an audio communication previously transmitted by another talk group member (e.g. communication device 200B) which may have been missed or not heard by the user of the communication device 200A. The audio inquiry may alternatively be a request for particular information that may be related to or included in an audio communication previously transmitted by another talk group member. For example, a talk group member (communication device 200A) may have received audio communication from another talk group member (communication device 200B) about an available witness of a particular incident. In response, the talk group member (communication device 200A) may send another audio communication on the talk group channel requesting the address of the available witness. In this example, the electronic computing device automatically analyzes the audio communication from communication device 200A and determines that the audio communication transmitted on the talk group channel relates to an audio inquiry from communication device 200A. In another example, a talk group member (communication device 200A) sends information collected from the available witness on the talk group channel. In this example, the electronic computing device may determine that the audio communication sent from communication device 200A on the talk group channel is merely a statement of information and does not relate to an audio inquiry, and therefore further does not require providing any response by the electronic digital assistant.

In accordance with some embodiments, the electronic computing device analyzes speech content in the monitored audio communications, for example, using NLP engine, to determine whether the speech content relates to an audio inquiry from a user of the communication device 200. The electronic computing device may also use additional information such as information obtained from data received from sensor devices and other type of information such as user's current incident assignment, location, role, communication groups, historical queries/actions, and the like to determine whether the audio communication relates to an audio inquiry from a user of the communication device.

Next, at block 430, the electronic computing device, in response to detecting an audio inquiry from a first communication device of the plurality of communication devices, processes the audio inquiry and generates an audio content response to be provided in response to the audio inquiry. In accordance with some embodiments, the electronic computing device analyzes the audio inquiry using NLP engine to obtain the intent and content of audio inquiry and accesses one of previous audio communications transmitted on the talk group channel and information stored in database(s) 164 to generate an audio content response. The electronic computing device may also use additional information such as information obtained from data received from sensor devices and other type of information such as user's current incident assignment, location, role, communication groups, historical queries/actions, and the like to determine the intent and content of the audio inquiry.

For example, if the audio inquiry indicates a request to repeat a segment of a previous conversation, the electronic computing device generates an audio content response that corresponds to one or more previous audio communications transmitted on the talk group channel. In one embodiment, the electronic computing device may store the monitored audio communications transmitted on the talk group channel so that the electronic computing device can access the stored audio communications for retransmission if it detects an audio inquiry requesting to repeat the audio communications previously transmitted on the talk group channel. In accordance with some embodiments, the electronic computing device also determines which segment of audio communications to be repeated based on one or more of the following: (a) keyword matching, in which the electronic computing device identifies if the audio inquiry specifically contains the information (e.g. location, name, address, etc.) about the segment of audio communications that needs to be repeated; (b) timing, in which the electronic computing device assigns higher priority to a most recent audio communication and lower priority to older audio communications and identifies the segment to be repeated based on audio communications with higher priority; (c) radio identification (ID), in which the electronic computing device assigns higher priority to audio communications from a communication device 200 with a particular radio ID, and identifies the segment to be repeated based on audio communication from the communication device 200 with higher priority; (d) incident ID, in which the electronic computing device assigns higher priority to audio communications received from one or more communication devices 200 assigned to the same incident, and identifies the segment to be repeated based on audio communications with higher priority.

In another example, if the audio inquiry indicates a request for information related to an address of an available witness of a particular incident, the electronic computing device may generate an audio content response containing the address of the available witness based on one or more of content extracted from the monitored audio communications and content accessed from one or more databases(s) 164 (for example, an incident database). In this example, the electronic computing device may be configured to identify the witness the user is referring to in his audio inquiry, even if the user does not explicitly mention the name of the witness. In this case, the electronic computing device uses additional information such as audio communications previously transmitted by talk group members on the talk group channel, information obtained from data received from sensor devices, user's current incident assignment, location, role, communication groups, historical queries/actions, and the like.

Next, at block 440, the electronic computing device determines whether the generated audio content response is to be individually provided to the first communication device. In one embodiment, the electronic computing device performs this determination based on one or both the audio inquiry and the audio content response, and further as a function of context information which is obtained corresponding to the first communication device. For example, the context information may include user profile information (location, role, talk group identifier, device identifier) corresponding to the user of the communication device, information related to user's current or historical incident assignment, information obtained from sensors associated with the communication device, for example, acoustic environmental data. The acoustic environmental data may include loudness or noise level indicators corresponding to a time period during which the audio inquiry is detected from the first communication device.

The electronic computing device may determine that the generated audio content response is to be provided individually to the first communication device in the following example scenarios:—(a) if the audio inquiry explicitly indicates that a response is to be provided individually; (b) if the generated audio content response includes content that is specific only to the user of the first communication device; (c) if the generated audio content response includes content that is personal, confidential, or restricted for one or more other members of the talk group; and (d) if the context information (e.g. user's current incident assignment) warrants that the response is to be provided only to the user of the first communication device. Other scenarios exist as well.

Next, at block 450, when the electronic computing device determines that the audio content response is not to be individually provided to the first communication device, then the electronic computing device transmits the audio content response on the talk group channel so that the audio content response is received by all members of the talk group. In one embodiment, the electronic computing device determines that the audio content response is not to be individually provided in the following example scenarios:— (a) if the audio inquiry includes a request for information that is relevant to all or most members in the talk group; (b) if the audio content response includes content that is relevant to all or most members in the talk group and further does not include any content that is personal, confidential, or restricted to any members in the talk group; (c) if the context information (e.g. current incident assigned to the talk group) warrants that the response is to be provided to all members of the talk group; and (d) if one of the talk group members (e.g. a member with sufficient security privileges or having a higher rank) sends an audio inquiry on the talk group channel with a request authorizing the electronic computing device to provide the audio content response on the talk group channel.

Returning to block 440, when the electronic computing device determines that the generated audio content response is to be individually provided to the first communication device, the electronic computing device proceeds to block 460 to establish a private call with the first communication device and block 470 to provide the audio content response via the private call. Providing audio content response individually to the first communication device via the private call (using a private channel that is different from the talk group channel) ensures that the audio content response is not received by other members of the talk group in which the first communication device is a member. In one embodiment, the electronic computing device also transmits the audio content response (previously sent only to the first communication device via the private call) on the talk group channel when it receives an audio inquiry that is an authorized request to repeat the audio content response on the talk group channel. For example, the first communication device which receives the audio content response via the private call or another member in the talk group may determine that the response is critical to all members in the talk group and may authorize the electronic computing device to share the content of the response with all members in the talk group. In this case, the electronic computing device repeats the audio content response on the talk group channel.

In one embodiment, the electronic computing device transmits a pre-stored audio indicator over the talk group channel before individually providing the audio content response to the first communication device via the private call. The pre-stored audio indicator indicates that the audio content response to the audio inquiry is being provided individually to the first communication device and not being transmitted on the talk group channel. The pre-stored audio indicator may be in the form of audio communication or text message that is transmitted on the talk group channel.

In accordance with some embodiments, when the first communication device switches from the talk group channel to a private channel to receive the audio content response from the electronic computing device, the first communication device may miss audio communications on the talk group channel during the period the first communication device is receiving the audio content response through the private channel. In these embodiments, the electronic computing device records audio communications transmitted on the talk group channel and missed by the first communication device during the time period the audio content response is being provided to the first communication device via the private call and further transmits the recorded audio communications to the first communication device via at least one other private call. In one embodiment, the electronic digital assistant establishes a subsequent private call to transmit the recorded audio communications only if the recorded audio communications missed by the first communication device includes emergency information or high priority information (for example, determined based on user's current incident assignment) to the user of the first communication device.

Figure 5:
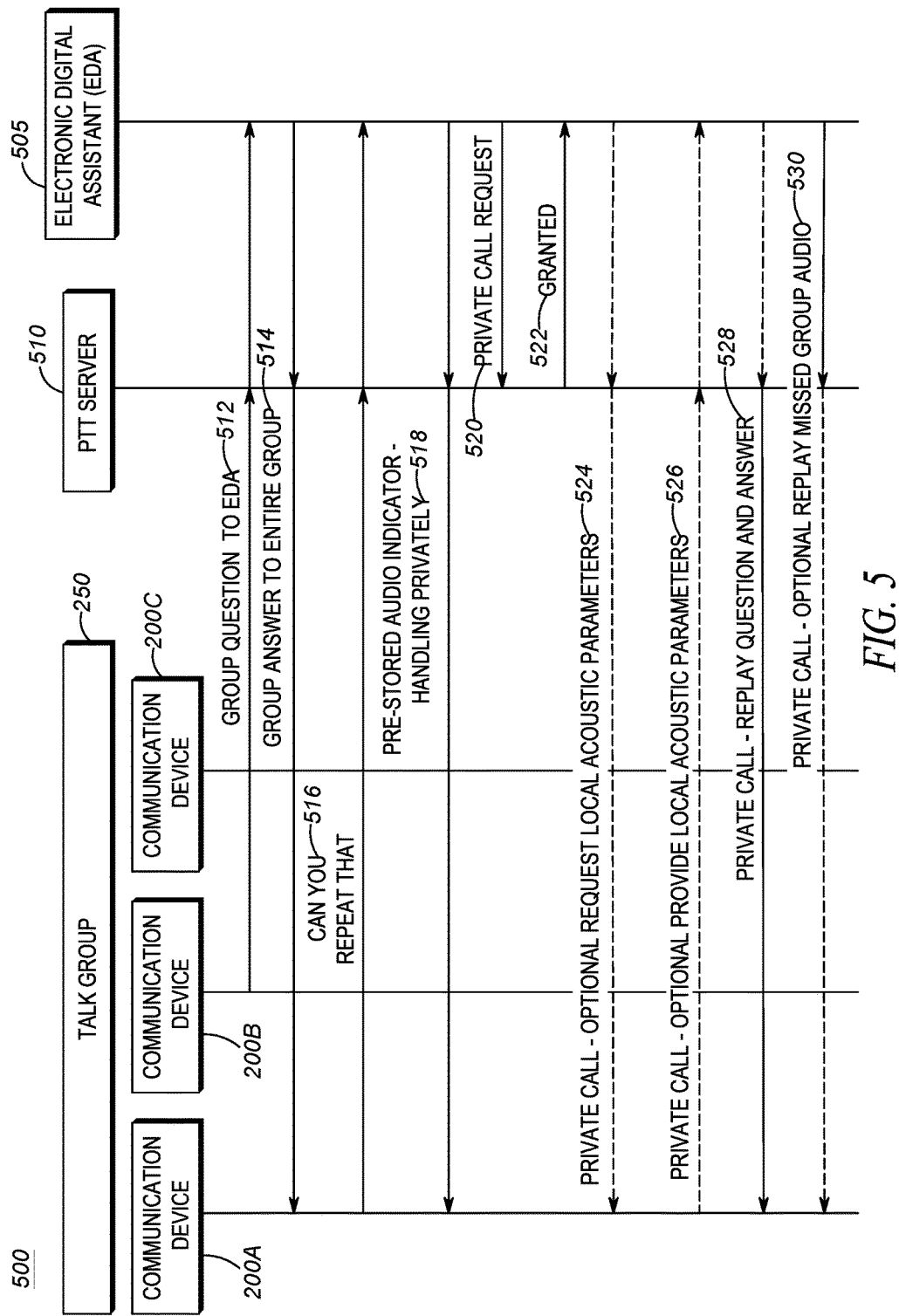
FIG. 5 illustrates a message flow diagram of a method of responding to an audio inquiry in accordance with some embodiments.

FIG. 5 illustrates a message flow diagram 500 of a method 400 of responding to an audio inquiry in accordance with some embodiments. The electronic digital assistant ('EDA') 505 monitors communications between communication devices 200A, 200B, 200C that are members of a talk group 250 which is controlled by a PTT server 510. The electronic digital assistant 505 may be implemented by one or more electronic computing devices described with reference to FIGS. 1 and 2.

As shown in FIG. 5, the communication device 200B sends a group question 512 on a talk group channel assigned to the talk group 250. The electronic digital assistant 505 which is monitoring the communications on the talk group channel via the PTT server 510, processes the group question 512 and generates a group answer 514 for transmission on the talk group channel. In this case, the user of the communication device 200A missed the group answer 514 transmitted on the talk group channel and sends an audio inquiry ("can you repeat that") 516 on the talk group channel via the communication device 200A. The electronic digital assistant 505, in response to detecting the audio inquiry 516, processes the audio inquiry and determines that the communication device 200A is requesting for the group answer to be repeated. The electronic digital assistant 505 transmits a pre-stored audio indicator 518 on the talk group channel to indicate to the communication devices 200A, 200B, 200C that the response to the audio inquiry transmitted by communication device 200A will be handled privately i.e. via a private call. The electronic digital assistant 505 then transmits a private call request 520 to the PTT server. When the electronic digital assistant 505 receives a grant response 522 to the private call request 520 from the PTT server 510, the electronic digital assistant 505 optionally requests 524 the communication device 200A via the private call to provide the local acoustic parameters, for example, the ambient noise level associated with the communication device 200A. In response, the communication device 200B provides 526 the local acoustic parameters to the electronic digital assistant 505. The electronic digital assistant 505 then re-plays 528 a recorded copy of the group answer 514 and optionally group question 512 on the communication device 200A via the private call.

In accordance with some embodiments, the electronic digital assistant 505 may modify the group answer 514 based on the local acoustic parameters received from the communication device 200A. For example, if the local acoustic parameters indicate that the ambient noise level associated with the communication device 200 exceeds a noise level threshold, the electronic digital assistant 505 may provide the group answer in text message format instead of the audio format. The electronic digital assistant 505 also optionally replays 530 recorded copy of the audio communications transmitted on the talk group channel and missed by the user of the communication device 200A while the recorded copy of the group answer 514 was played at the communication device 200A.

Figure 6:
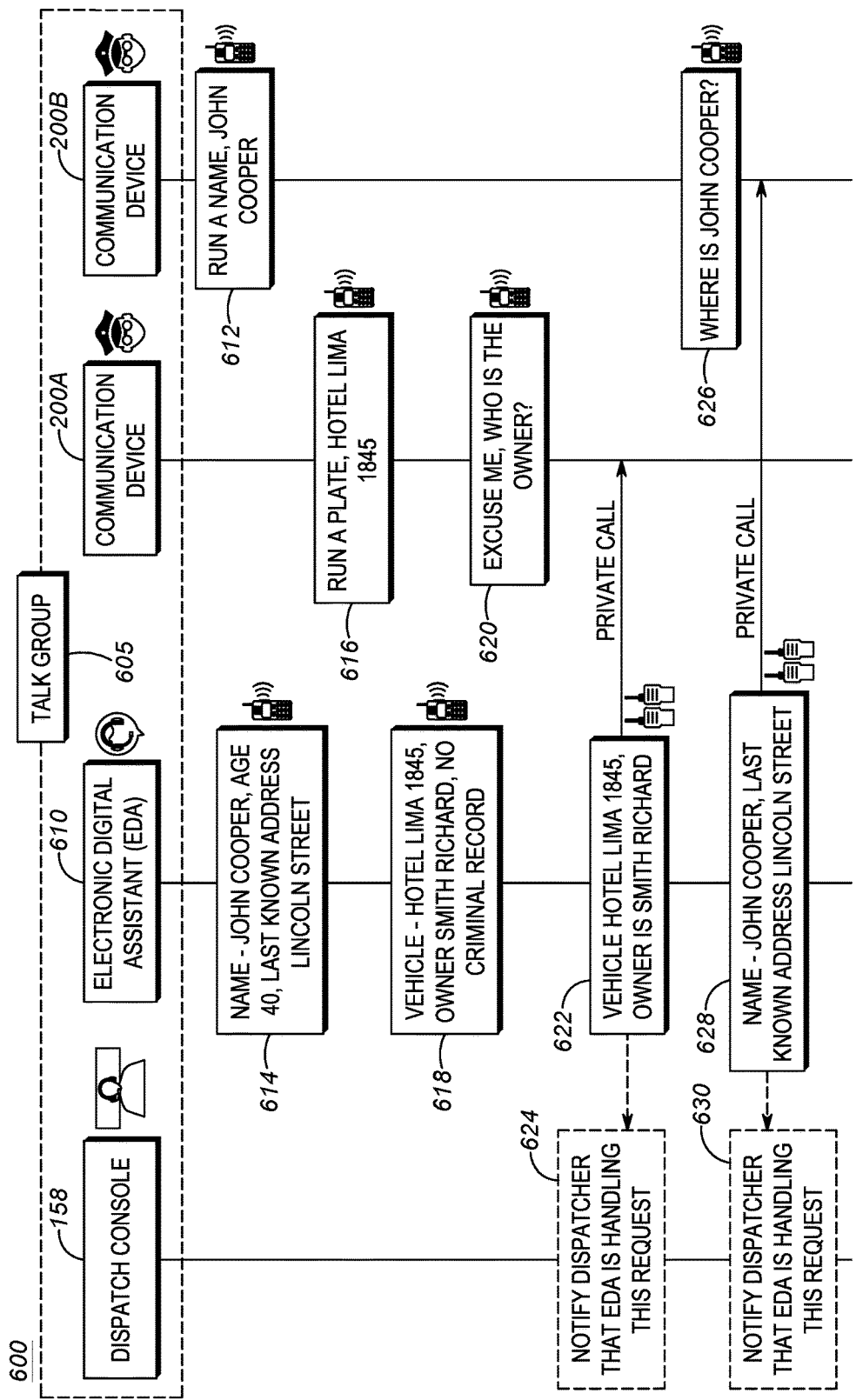
FIG. 6 illustrates an example use case in which the embodiments described herein can be implemented.

FIG. 6 illustrates an example use case 600 in which the embodiments described herein can be implemented. In the example use case 600, a dispatch console (e.g. dispatch console 158 shown in FIG. 1) and communication devices (e.g. devices 200A, 200B shown in FIG. 2) are members of a talk group 605. The electronic digital assistant 610 is also added to the talk group 605 to monitor audio communications between communication devices 200A, 200B and dispatch console 158. The electronic digital assistant 610 is implemented by one or more electronic computing devices described with reference to FIGS. 1 and 2.

In the example use case 600, the communication device 200B transmits an audio inquiry 612 to request a member of the talk group 605 to run the name of a person, 'John Cooper'. Since the electronic digital assistant 610 is already monitoring the audio communications in the talk group 605, the electronic digital assistant 610 processes the audio inquiry 612 and provides a response 614 with the results of running the name across the database(s) 164. In this case, the response 614 is transmitted in the talk group 605 for receipt by all members of the talk group 605 as the content of the audio query 612 and the response 615 is relevant to all the members in the talk group 605. The response 614 may include name, age, and last known address of the person.

Similarly, the communication device 200A transmits an audio inquiry 616 requesting a member of the talk group 605 to run a vehicle license plate. The electronic digital assistant 610 automatically processes the audio inquiry 616 and transmits a response 618 with the results of the running the vehicle license plate across the database(s) 164. In this case, the response 618 is transmitted in the talk group 605 for receipt by all members of the talk group as the content of audio inquiry 616 and the response 618 is relevant to all members in the talk group. The response 618 includes name of the owner of the vehicle and any criminal background. In accordance with some embodiments, the electronic digital assistant 610 also includes content (such as identity of the person, vehicle, or intent of the query) of the audio inquiry 616 in the response 618 (for example, at the beginning or end of the response) to allow members of the talk group 605 to associate the response 618 to the audio inquiry 616. In the example shown in FIG. 6, the user of the communication device 200A has missed particular information included in the response 618 transmitted in the talk group 605 and sends an audio inquiry 620 requesting to repeat the name of the owner of the vehicle. The electronic digital assistant 610 processes the audio inquiry 620 and identifies the intent of the audio inquiry 620, which is to repeat the name of the owner of the vehicle. In accordance with embodiments, the electronic digital assistant 610 determines whether to provide a response to the audio inquiry 620 individually to the communication device 200A or to all members in the talk group 605. In this example, since the intent of the audio inquiry 620 is to repeat the name of the owner of the vehicle which is already sent in the talk group and only missed by the user of the communication device 200A, the electronic digital assistant 610 decides to provides a response to the audio inquiry 620 individually to the communication device. Accordingly, the electronic digital assistant 610 establishes a private call with communication device 200A and sends a response 622 with name of the owner of the vehicle as requested by the user of the communication device 200A.

Optionally, the electronic digital assistant 610 sends a notification 624 to the dispatch console 158 (either via a private call with the dispatch console or in the talk group 605) to indicate that the electronic digital assistant 610 is handling the audio inquiry 620. This allows a human dispatcher (associated with the dispatch console 158), who otherwise may be responsible for responding to such audio inquiries, to not respond to the audio inquiry 620 when such a notification 624 is received, thereby reducing the workload associated with the dispatcher.

In the example shown in FIG. 6, the communication device 200B similarly sends an audio inquiry 626 requesting the location of a person (i.e. "where is John Cooper"). In this case, the electronic digital assistant 610 processes the audio inquiry and further based on the intent of the inquiry, identifies that the response (i.e. location of the person) is to be individually provided to communication device 200B and not in the talk group 605. Accordingly, the electronic digital assistant 610 establishes a private call with communication device 200B and sends a response 628 with last known address of the person named 'John Cooper'. Optionally, the electronic digital assistant 610 sends a notification 630 to the dispatch console 158 to indicate that the electronic digital assistant 610 is handling the audio inquiry 626.

Figure 7:
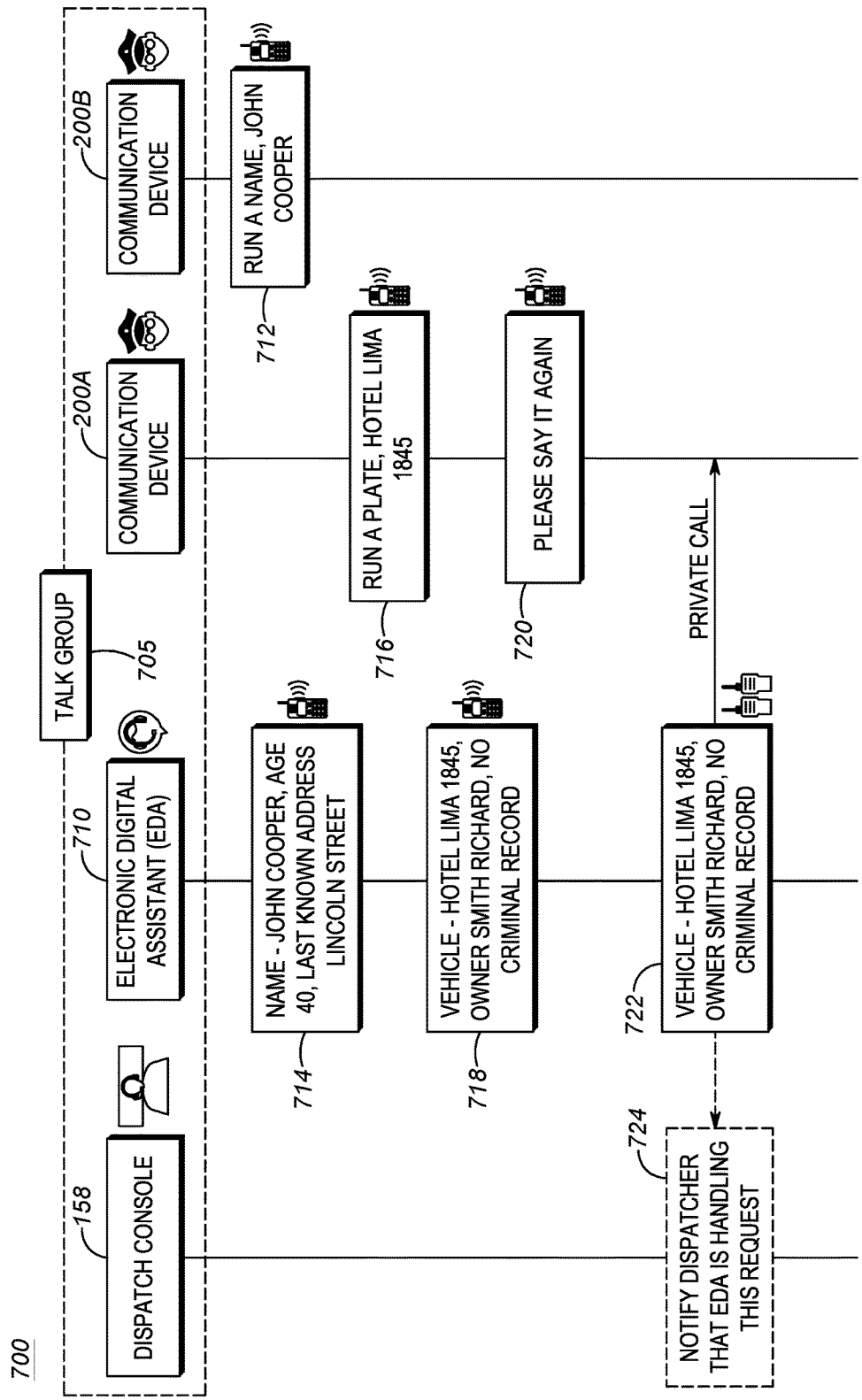
FIG. 7 illustrates an example use case in which the embodiments described herein can be implemented.

FIG. 7 illustrates an example use case 700 in which the embodiments described herein can be implemented. In the example use case 700, a dispatch console (e.g. dispatch console 158 shown in FIG. 1) and communication devices (e.g. devices 200A, 200B shown in FIG. 2) as members of a talk group 705. The electronic digital assistant 710 is also added to the talk group 705 to monitor audio communications between communication devices 200A, 200B and dispatch console 158. The electronic digital assistant 710 is implemented by one or more electronic computing devices described with reference to FIGS. 1 and 2.

In the example use case 700, the communication device 200B transmits an audio inquiry 712 to request a member of the talk group to run the name of a person, 'John Cooper'. Since the electronic digital assistant 710 is already monitoring the audio communications in the talk group 705, the electronic digital assistant 710 processes the audio inquiry 712 and provides a response 714 with the results of running the name across the database(s) 164. In this case, the response 714 is transmitted in the talk group for receipt by all members of the talk group 605 as the content of the audio inquiry 712 and the response 714 is relevant to all the members in the talk group 705. The response 714 may include name, age, and last known address of the person for whom the name is ran.

Similarly, the communication device 200A transmits an audio inquiry 716 requesting a member of the talk group 705 to run a vehicle license plate. The electronic digital assistant 710 automatically processes the audio inquiry 716 and transmits a response 718 with the results of the running the vehicle license plate across the database(s) 164. In this case, the response 718 is transmitted in the talk group 605 for receipt by all members of the talk group as the content of audio inquiry 716 and the response 718 is relevant to all members in the talk group. The response 718 includes name of the owner of the vehicle and any criminal background. In accordance with some embodiments, the electronic digital assistant 710 also includes content (such as identity of the person, vehicle, or intent of the query) of the audio inquiry 716 in the response 718 (for example, at the beginning or end of the response) to allow members of the talk group to associate the response 718 to the audio inquiry 716. In the example shown in FIG. 7, the user of the communication device 200A has missed the response 718 transmitted in the talk group 705 and sends an audio inquiry 720 ("please say it again") to repeat the response 718. The electronic digital assistant 710 processes the audio inquiry 720 and identifies the intent of the audio inquiry, which is to repeat the response 718 previously transmitted by the electronic digital assistant 710. In accordance with embodiments, the electronic digital assistant 710 determines whether to provide a response to the audio inquiry 720 individually to the communication device 200A or to all members in the talk group 705. In this example, since the intent of the audio inquiry 720 is to repeat the response 718 previously transmitted in the talk group 705 and only missed by the user of the communication device 200A, the electronic digital assistant 710 decides to provide a response to the audio inquiry 720 individually to the communication device. Accordingly, the electronic digital assistant 710 establishes a private call with communication device 200A and sends a response 722, which includes the content of the response 718.

Optionally, the electronic digital assistant 710 sends a notification 724 to the dispatch console 158 (either via a private call with the dispatch console 158 or in the talk group 705) to indicate that the electronic digital assistant 710 is handling the audio inquiry 720. This allows a human dispatcher (associated with the dispatch console 158), who otherwise may be responsible for responding to such audio inquiries, to not respond to the audio inquiry 720 when such a notification 724 is received, thereby reducing the workload associated with the dispatcher.

Figure 8:
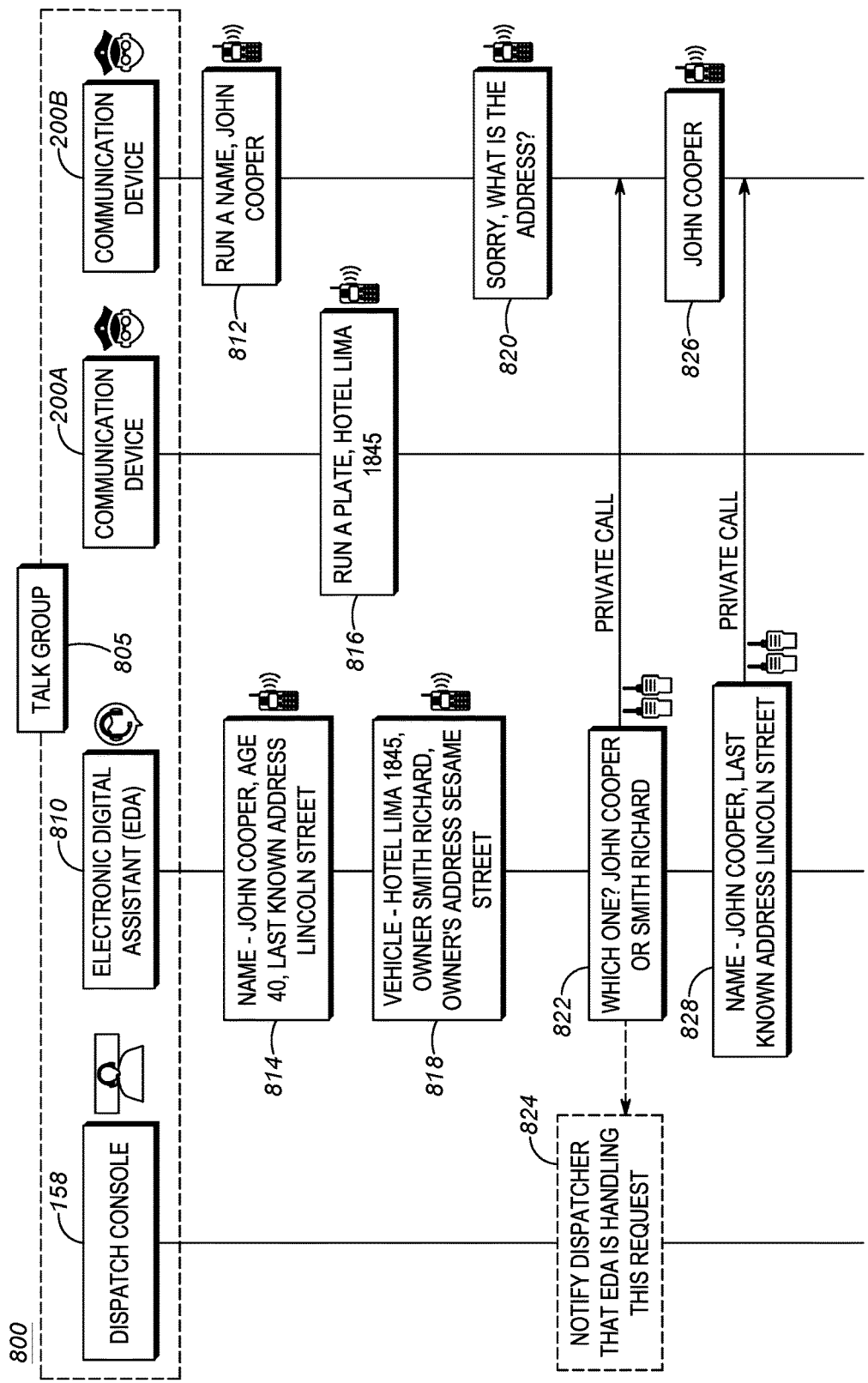
FIG. 8 illustrates an example use case in which the embodiments described herein can be implemented.

FIG. 8 illustrates an example use case 800 in which the embodiments described herein can be implemented. In the example use case 800, a dispatch console (e.g. dispatch console 158 shown in FIG. 1) and communication devices (e.g. devices 200A, 200B shown in FIG. 2) are shown as members of a talk group 805. The electronic digital assistant 810 is also added to the talk group 805 to monitor audio communications between communication devices 200A, 200B, and dispatch console 158. The electronic digital assistant 810 is implemented by one or more electronic computing devices described with reference to FIGS. 1 and 2.

In the example use case 800, the communication device 200B transmits an audio inquiry 812 to request a member of the talk group 805 to run the name of a person, 'John Cooper'. Since the electronic digital assistant 810 is already monitoring the audio communications in the talk group 805, the electronic digital assistant 810 processes the audio inquiry 812 and provides a response 814 with the results of running the name across the database(s) 164. In this case, the response 814 is transmitted in the talk group for receipt by all members of the talk group 805 as the content of the audio inquiry 812 and the response 814 is relevant to all the members in the talk group 805. The response 814 may include name, age, and last known address of the person for whom the name is ran.

Similarly, the communication device 200A transmits an audio inquiry 816 requesting a member of the talk group 805 to run a vehicle license plate. The electronic digital assistant 810 automatically processes the audio inquiry 816 and transmits a response 818 with the results of the running the vehicle license plate across the database(s) 164. In this case, the response 818 is transmitted in the talk group 805 for receipt by all members of the talk group 805 as the content of audio inquiry 816 and the response 818 is relevant to all members in the talk group. The response 818 includes name of the owner of the vehicle and address of the owner. In accordance with some embodiments, the electronic digital assistant 810 also includes content (such as identity of the person, vehicle, or intent of the query) of the audio inquiry 816 in the response 818 (for example, at the beginning or end of the response) to allow members of the talk group 805 to associate the response 818 to the audio inquiry 816.

In the example shown in FIG. 8, the user of the communication device 200B has missed particular information included in the response 818 transmitted in the talk group and sends an audio inquiry 820 ("sorry, what is the address?") requesting to repeat an address. The electronic digital assistant 810 processes the audio inquiry 620 and identifies the intent of the audio inquiry 820, which is to repeat an address. However, in this example, the electronic digital assistant 810 further identifies that two previous audio communications (i.e. responses 814, 818) in the talk group include content with address of different persons. In some embodiments, the electronic digital assistant may use additional information such as context information associated with the user of the communication device 200B to identify which address the user is referring to in the audio inquiry 820. In the current example, in response to the audio inquiry 820, the electronic digital assistant 810 generates an audio response 822 in the form of an audio inquiry requesting the name of the person (i.e. whether the user of device 200B is referring to address of 'John Cooper' contained in the response 814 or address of 'Smith Richard' contained in the response 818) for whom the user of the communication device 200B is requesting to repeat the address. In accordance with embodiments, the electronic digital assistant 810 further determines whether to provide a response to the audio inquiry 820 individually to the communication device 200B or to all members in the talk group 805. In this example, since the intent of the audio inquiry 820 is to repeat an address which is already sent in the talk group 805 and only missed by the user of the communication device 200B, the electronic digital assistant 810 decides to provide a response to the audio inquiry 820 individually to the communication device 200B. Accordingly, the electronic digital assistant 810 establishes a private call with communication device 200B and transmits a response 822 with an audio inquiry requesting the name of the person for whom the user of the communication device 200B is requesting to repeat the address.

Optionally, the electronic digital assistant 810 transmits a notification 824 to the dispatch console 158 (either via a private call with the dispatch console or in the talk group 805) to indicate that the electronic digital assistant 810 is handling the audio inquiry 820. This allows a human dispatcher (associated with the dispatch console), who otherwise may be responsible for responding to such audio inquiries, to ignore the audio inquiry 620, thereby reducing the workload associated with the dispatcher. The communication device 200B transmits, via the private call, an audio inquiry 826 including the name of the person (i.e. 'John Cooper') for whom the user of the communication device 200B is requesting the address. In response, the electronic digital assistant 810 processes the audio inquiry and generates a response 828 with the last known address of the person, 'John Cooper'. The electronic digital assistant 810 then sends the response 828 via the private call.

Figure 9:
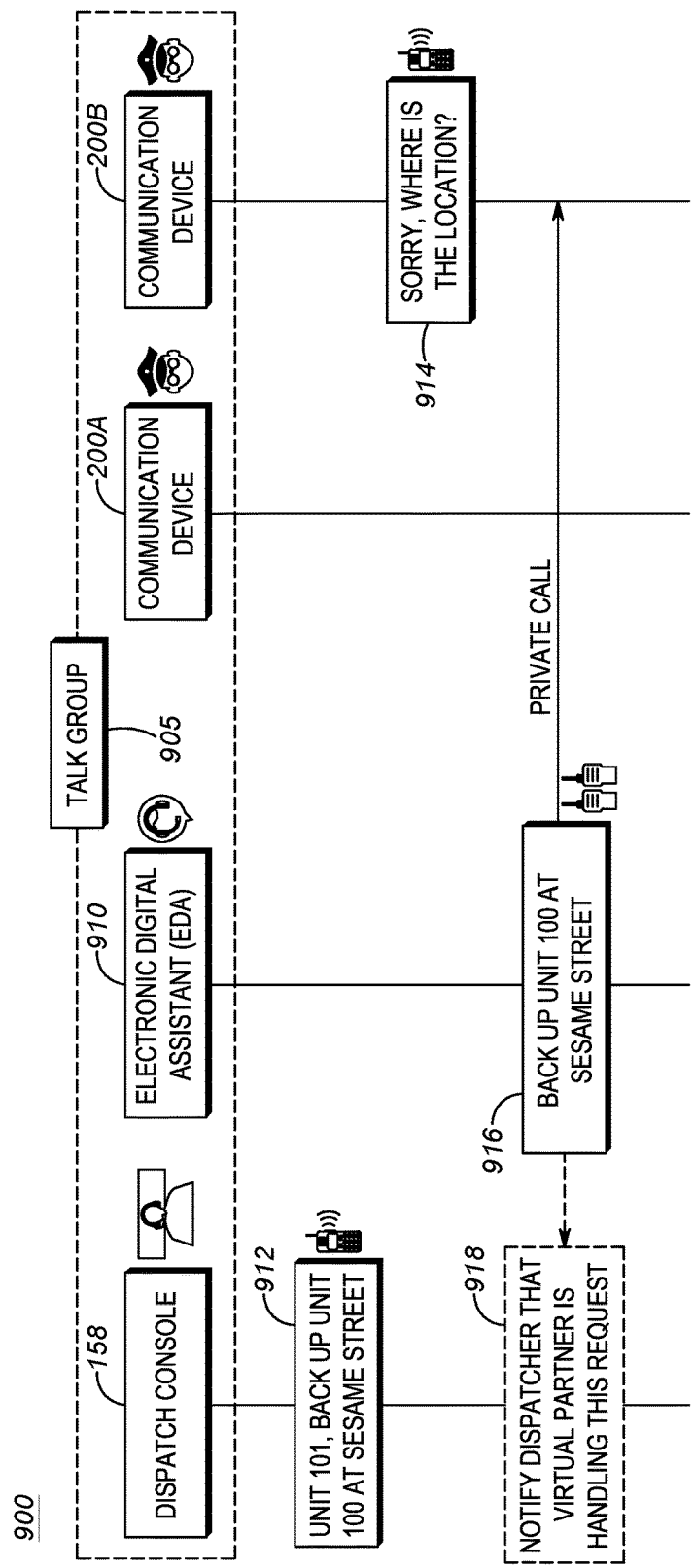
FIG. 9 illustrates an example use case in which the embodiments described herein can be implemented.

FIG. 9 illustrates an example use case 900 in which the embodiments described herein can be implemented. In the example use case 900, a dispatch console (e.g. dispatch console 158 shown in FIG. 1) and communication devices (e.g. devices 200A, 200B shown in FIG. 2) are shown as members of a talk group 905. The electronic digital assistant 910 is also added to the talk group 905 to monitor audio communications between communication devices 200A, 200B and dispatch console 158. The electronic digital assistant 910 is implemented by one or more electronic computing devices described with reference to FIGS. 1 and 2.

In the example use case 900, the dispatch console transmit an audio notification 912 in the talk group 905 requesting first responders unit '101' and back up unit '100' to arrive at a location of an incident. The first responder unit 101 corresponds to user of the communication device 200A and back up unit '100' corresponds to user of the communication device 200B. The user of the communication device 200B has missed particular information included in the audio notification 912 transmitted in the talk group 905 and sends an audio inquiry 914 requesting the location. The electronic digital assistant 910 processes the audio inquiry 915 and identifies the intent of the audio inquiry 820, which is to repeat the location contained in the audio notification 912. In response to the audio inquiry 914, the electronic digital assistant 910 generates an audio response 916. In this example, since the intent of the audio inquiry 820 is to repeat a location which is already sent in the talk group 905 and only missed by the user of the communication device 200B, the electronic digital assistant 910 decides to provide a response to the audio inquiry 914 individually to the communication device 200B. Accordingly, the electronic digital assistant 910 establishes a private call with communication device 200B and transmits a response 916 including the location of the incident. Optionally, the electronic digital assistant 910 transmits a notification 918 to the dispatch console 158 (either via a private call with the dispatch console or in the talk group 805) to indicate that the electronic digital assistant 910 is handling the audio inquiry 920. This allows a human dispatcher (associated with the dispatch console 158), who otherwise may be responsible for responding to such audio inquiries, to not to respond to audio inquiry 914 when such a notification 918 is received, thereby reducing the workload associated with the dispatcher.

In addition to the use cases presented above, the electronic digital assistant can decide to switch a communication device 200 to private call or continue transmission in the same talk group based on the following type of audio communications:—a) Acknowledgement: when a user of the communication device 200 submits a command (e.g. update unit status on computer aided dispatch (CAD) interface) for transmission on the talk group channel, the electronic digital assistant automatically provides acknowledgement through private channel after updating the unit status on CAD interface; b) Interruption: when the electronic digital assistant provides a response to an audio inquiry on the talk group channel, it is possible that the response may be interrupted with a high priority message on the same talk group channel. In such cases, the electronic digital assistant provides the interrupted response to the audio inquiry via a private channel with the requesting communication device; c) Follow up question: when the requesting communication device has one or more follow up questions after receiving a response to the audio inquiry from the electronic digital assistant, the electronic digital assistant switches the requesting communication device to a private channel to respond to the follow questions if the content of the questions is not critical or relevant to other members of the talk group. Alternatively, if the follow up questions received from the requesting communication device via a private call is critical or relevant to members of the talk group, the electronic digital assistant may switch to the talk group channel to respond to the follow up questions so that the response to the follow up questions can be received by all members of the talk group; d) Situational alert/Reminder/Notification: the electronic digital assistant may send situational alerts like weather condition, traffic information based on the context information associated with individual members of the talk group. If the context information indicates that other talk group members are interested in this information, then the electronic digital assistant sends such information via a private channel to specific communication devices; and (e) Multiple query handling: when the electronic digital assistant is processing an audio inquiry from one member of the talk group, it is possible that the electronic digital assistant may be receiving audio inquiries from one or more other members of the talk group. In such cases, the electronic digital assistant analyzes the context of the individual audio inquiries and returns response through private channel to avoid delay in delivering information if the context of the individual audio inquiries indicates that the response is not critical to other members of the talk group.

In accordance with embodiments of the disclosure, system and methods described herein can be advantageously employed in public safety environments to automatically respond to audio inquiries received from public safety officers on a talk group channel, while reducing communication traffic on the talk group channel. Implementation of the embodiments described herein also improves the user experience of talk group members by reducing the delay in which response is provided to requesting members of the talk group and also further reduces workload of members of the talk group who otherwise may need to manually find answers (for example, by manually checking the conversation history or information databases) to such inquiries and send responses to the audio inquiries on the talk group channel.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of responding to an audio inquiry, comprising:
    monitoring, at an electronic computing device, audio communications transmitted between a plurality of communication devices on a talk group channel, wherein the plurality of communication devices are members of a talk group associated with the talk group channel;
    detecting, at the electronic computing device, that one of the audio communications transmitted between the communication devices on the talk group channel, corresponds to an audio inquiry from a first communication device of the plurality of communication devices;
    processing, at the electronic computing device, the audio inquiry and generating an audio content response to be provided in response to the audio inquiry;
    obtaining, at the electronic computing device, context information corresponding to the first communication device;
    determining, at the electronic computing device, based on one or both of the audio inquiry and the audio content response, and as a function of the context information, whether the audio content response is to be individually provided to the first communication device or to be transmitted on the talk group channel;
    responsive to determining that the audio content response is to be individually provided to the first communication device, establishing, at the electronic computing device, a private call with the first communication device and providing the audio content response to the first communication device via the private call; and
    responsive to determining that the audio content response is to be transmitted on the talk group channel, transmitting the audio content response to the plurality of communication devices on the talk group channel.

2. The method of claim 1, wherein in response to the determining that the audio content response is to be individually provided to the first communication device, the method further comprising:
    transmitting, at the electronic computing device, a pre-stored audio indicator to the plurality of communication devices over the talk group channel, the pre-stored audio indicator indicating that the audio content response to the audio inquiry is being provided individually to the first communication device and not being transmitted on the talk group channel.

3. The method of claim 2, wherein in response to transmitting the pre-stored audio indicator, the method further comprising:
    detecting, that one of the audio communications transmitted between the communication devices on the talk group channel, corresponds to a second audio inquiry;
    processing the second audio inquiry and determining that the second audio inquiry corresponds to an authorized request to repeat the audio content response on the talk group channel; and
    transmitting the audio content response on the talk group channel.

4. The method of claim 1, wherein in response to the determining that the audio content response is to be individually provided to the first communication device, the method further comprising:
    refraining from transmitting the audio content response on the talk group channel.

5. The method of claim 1, wherein generating audio content response comprises:
    generating the audio content response based on one or both of content extracted from the monitored audio communications and content accessed from one or more databases.

6. The method of claim 1, wherein processing the audio inquiry comprises:
    extracting one or more keywords from the audio inquiry; and
    determining, based on the extracted one or more keywords, that the audio inquiry corresponds to a request to repeat a portion of the monitored audio communications including the one or more keywords preceding the audio inquiry, and responsively:
        determining that the audio content response is to be individually provided to the first communication device; and providing the audio content response including the portion of the monitored audio communications to the first communication device via the private call.

7. The method of claim 1, wherein the context information includes one or more of acoustic environmental data associated with the first communication device, user profile associated with the first communication device, and incident assignment associated with the first communication device.

8. The method of claim 7, wherein the acoustic environmental data corresponds to a time period during which the audio inquiry is detected.

9. The method of claim 1, further comprising:
recording audio communications transmitted on the talk group channel and missed by the first communication device during a time period the audio content response is being provided to the first communication device via the private call; and
transmitting the recorded audio communications to the first communication device via at least one other private call.

10. The method of claim 1, wherein monitoring comprises:
establishing a communication with a talk group server controlling the audio communications between the plurality of communication devices on the talk group channel; and
accessing the audio communications via the talk group server.

11. The method of claim 1, further comprising:
determining that the audio inquiry corresponds to a natural language query;
identifying, using the natural language processing engine, an intent and content of the audio inquiry; and
generating the audio content response based on the identified intent and content of the audio inquiry.

12. The method of claim 1, wherein determining comprises:
identifying that the audio content response includes content that is restricted for one or more of the members of the talk group other than the first communication device, and responsively determining that the audio content response is to be individually provided to the first communication device.

13. The method of claim 1, wherein determining comprises:
identifying that the audio content response does not include content that is restricted to any of the members of the talk group, and responsively determining that the audio content response is to be transmitted to the plurality of communication devices on the talk group channel.

14. The method of claim 1, wherein the context information includes a current incident assignment associated with a user of the first communication device, wherein determining, as a function of the current incident assignment, whether the audio content response is to be individually provided to the first communication device or to be transmitted on the talk group channel.

15. An electronic computing device, comprising:
an electronic processor; and
a communication interface communicatively coupled to the electronic processor, wherein the electronic processor is configured to:
monitor, audio communications transmitted between a plurality of communication devices on a talk group channel, wherein the plurality of communication devices are members of a talk group associated with the talk group channel,
detect that one of the audio communications transmitted between the communication devices on the talk group channel corresponds to an audio inquiry from a first communication device of the plurality of communication devices;
process the audio inquiry and generate an audio content response to be provided in response to the audio inquiry,
obtain context information corresponding to the first communication device,
determine, based on one or both of the audio inquiry and the audio content response, and as a function of the context information, whether the audio content response is to be individually provided to the first communication device or to be transmitted on the talk group channel,
establish, using the communication interface, a private call with the first communication device and provide the audio content response to the first communication device via the private call when it is determined that the audio content response is to be individually provided to the first communication device; and
transmit the audio content response to the plurality of communication devices on the talk group channel when it is determined that the audio content response is to be transmitted on the talk group channel.

16. The electronic computing device of claim 15, wherein the electronic processor is configured to transmit, via the communication interface, a pre-stored audio indicator to the plurality of communication devices over the talk group channel when it is determined that the audio content response is to be individually provided to the first communication device, wherein the pre-stored audio indicator indicates that the audio content response to the audio inquiry is being provided individually to the first communication device and not being transmitted on the talk group channel.

17. The electronic computing device of claim 15, wherein the electronic processor is configured to:
detect that one of the audio communications transmitted between the communication devices on the talk group channel corresponds to a second audio inquiry;
process the second audio inquiry and determining that the second audio inquiry corresponds to an authorized request to repeat the audio content response on the talk group channel; and
transmit, via the communication interface, the audio content response on the talk group channel.

18. The electronic computing device of claim 15, wherein the electronic processor is configured to refrain from transmitting the audio content response on the talk group channel when it is determined that the audio content response is to be individually provided to the first communication device.

19. The electronic computing device of claim 15, wherein the electronic processor is configured to generate the audio content response based on one or both of content extracted from the monitored audio communications and content accessed from one or more databases.

20. The electronic computing device of claim 15, wherein the electronic processor is configured to:
extract one or more keywords from the audio inquiry;
determine, based on the extracted one or more keywords, that the audio inquiry corresponds to a request to repeat a portion of the monitored audio communications including the one or more keywords preceding the audio inquiry;

determine that the audio content response is to be individually provided to the first communication device when the audio inquiry corresponds to the request to repeat the portion of the monitored audio communications; and provide the audio content response including the portion of the monitored audio communications to the first communication device via the private call.

21. The electronic computing device of claim 15, wherein the context information includes one or more of acoustic environmental data associated with the first communication device, user profile associated with the first communication device, and incident assignment associated with the first communication device.

22. The electronic computing device of claim 21, wherein the acoustic environmental data corresponds to a time period during which the audio inquiry is detected.

23. The electronic computing device of claim 15, wherein the electronic processor is configured to:

record audio communications transmitted on the talk group channel and missed by the first communication device during a time period the audio content response is being provided to the first communication device via the private call; and transmit, via the communication interface, the recorded audio communications to the first communication device via at least one other private call.

24. The electronic computing device of claim 15, wherein the electronic processor is configured to:

establish, via the communication interface, a communication with a talk group server controlling the audio communications between the plurality of communication devices on the talk group channel; and access the audio communications via the talk group server.

25. The electronic computing device of claim 15, wherein the electronic processor is configured:

determine that the audio inquiry corresponds to a natural language query;

identify, using the natural language processing engine, an intent and content of the audio inquiry; and generate the audio content response based on the identified intent and content of the audio inquiry.

* * * * *